US010252152B2

(12) United States Patent
Segal

(10) Patent No.: US 10,252,152 B2
(45) Date of Patent: Apr. 9, 2019

(54) MOVING OBJECT DETECTION SYSTEM AND METHOD

(71) Applicant: Edo Segal, New York, NY (US)

(72) Inventor: Edo Segal, New York, NY (US)

(73) Assignee: bMuse Group LLC, New York, NY (US)

( * ) Notice: Subject to any disclaimer, the term of this patent is extended or adjusted under 35 U.S.C. 154(b) by 354 days.

(21) Appl. No.: 15/042,080

(22) Filed: Feb. 11, 2016

(65) Prior Publication Data

US 2016/0236076 A1    Aug. 18, 2016

Related U.S. Application Data

(60) Provisional application No. 62/115,017, filed on Feb. 11, 2015.

(51) Int. Cl.
| | |
|---|---|
| *A63F 13/213* | (2014.01) |
| *G06K 7/10* | (2006.01) |
| *A63F 13/245* | (2014.01) |
| *A63F 9/02* | (2006.01) |
| *A63F 9/24* | (2006.01) |
| *A63F 11/00* | (2006.01) |

(52) U.S. Cl.
CPC ............ *A63F 13/213* (2014.09); *A63F 9/02* (2013.01); *A63F 13/245* (2014.09); *G06K 7/10564* (2013.01); *A63F 2009/0286* (2013.01); *A63F 2009/2445* (2013.01); *A63F 2009/2447* (2013.01); *A63F 2009/2454* (2013.01); *A63F 2011/0072* (2013.01)

(58) Field of Classification Search
CPC ......... G01P 3/64; G06K 7/10; G06K 7/10564
See application file for complete search history.

(56) References Cited

U.S. PATENT DOCUMENTS

| | | | | |
|---|---|---|---|---|
| 5,082,365 A | * | 1/1992 | Kuzmick | ................. G01P 3/68 |
| | | | | 356/28 |
| 8,242,434 B2 | * | 8/2012 | Lippuner | ........... G01D 5/34776 |
| | | | | 250/231.13 |
| 2009/0284760 A1 | * | 11/2009 | Chuma | .................. G01D 5/347 |
| | | | | 356/614 |
| 2010/0066588 A1 | * | 3/2010 | Chen | ........................ G01P 3/38 |
| | | | | 342/109 |

* cited by examiner

*Primary Examiner* — Luke D Ratcliffe
(74) *Attorney, Agent, or Firm* — Leason Ellis LLP

(57) ABSTRACT

Disclosed is a code detecting system and method associated with moving objects. A light source provides light and sensor detects light as it reflects from a code supported by a moving object. Light from the light source reflects from a first portion of the code as the object moves, and is detected by the light sensor. Light from the light source reflects from at least a second portion of the code as the object moves, and is detected by the light sensor. A processor determines information representing the moving object, a first time when the at least one sensor detects the light reflecting from the first portion of the machine readable code and a second time when the at least one sensor detects the light reflecting from the second portion of the machine readable code. The speed of the moving object is determined thereby and displayed.

20 Claims, 53 Drawing Sheets

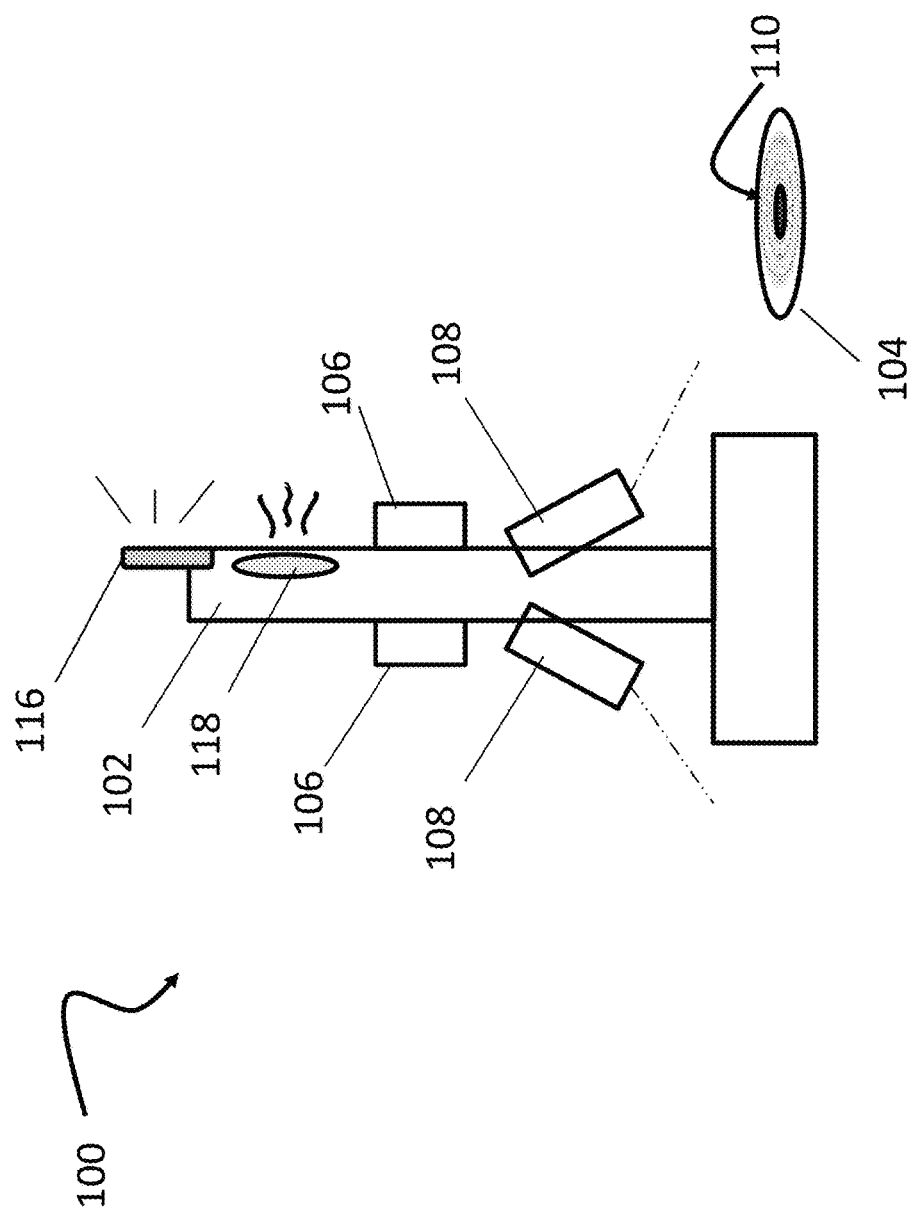

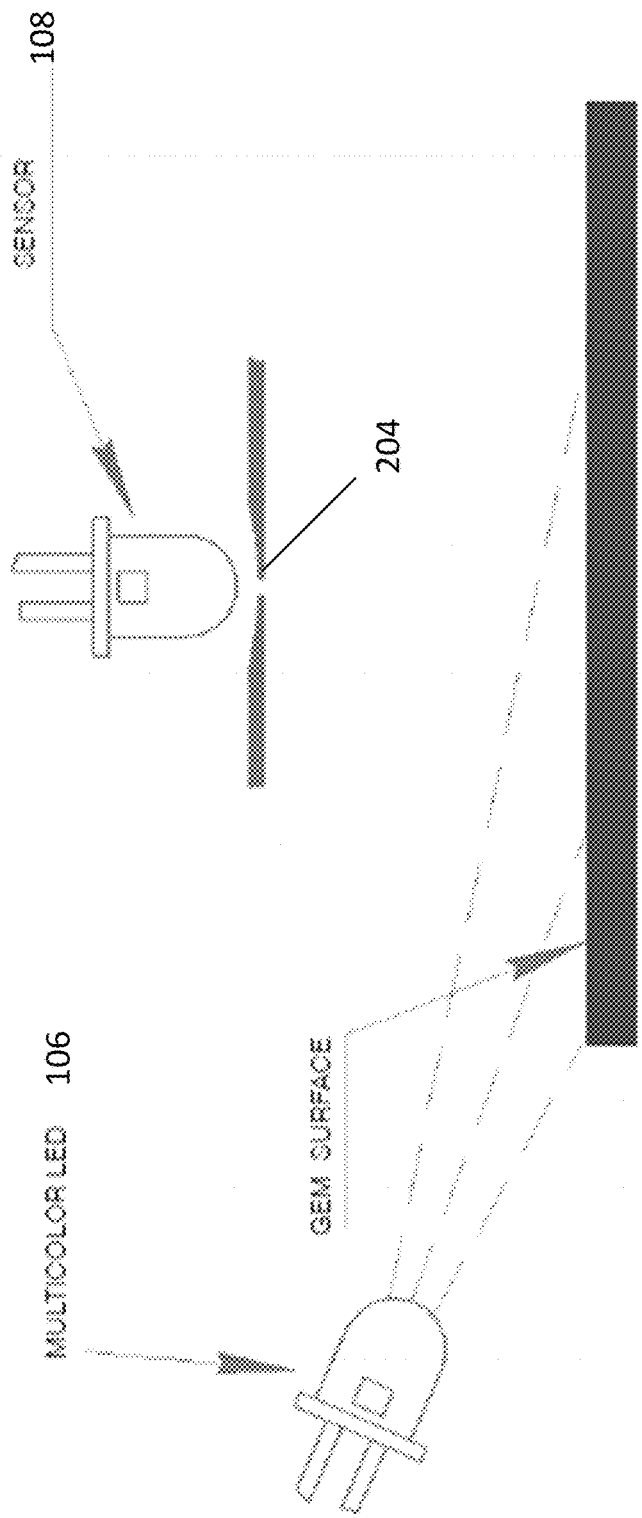

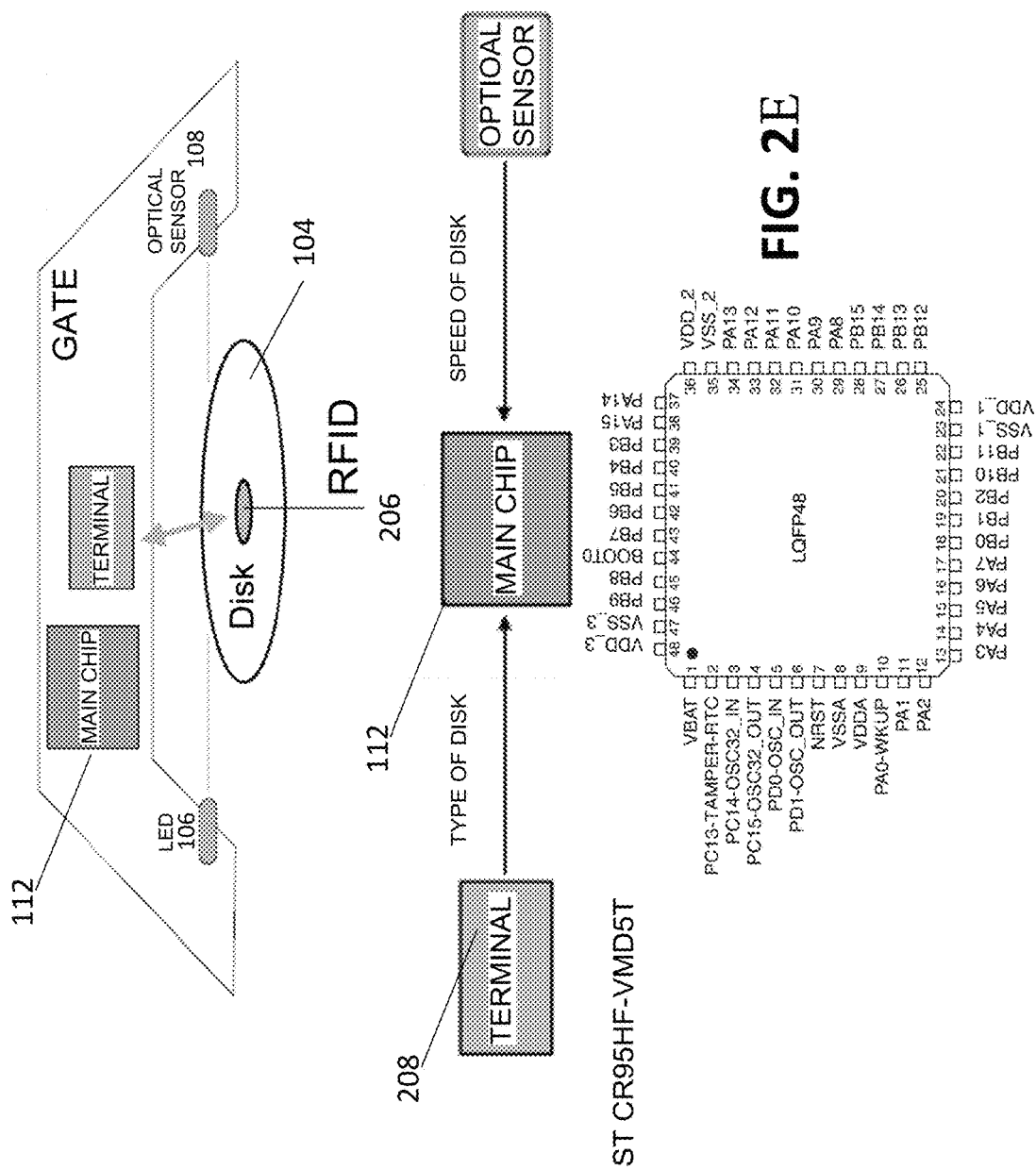

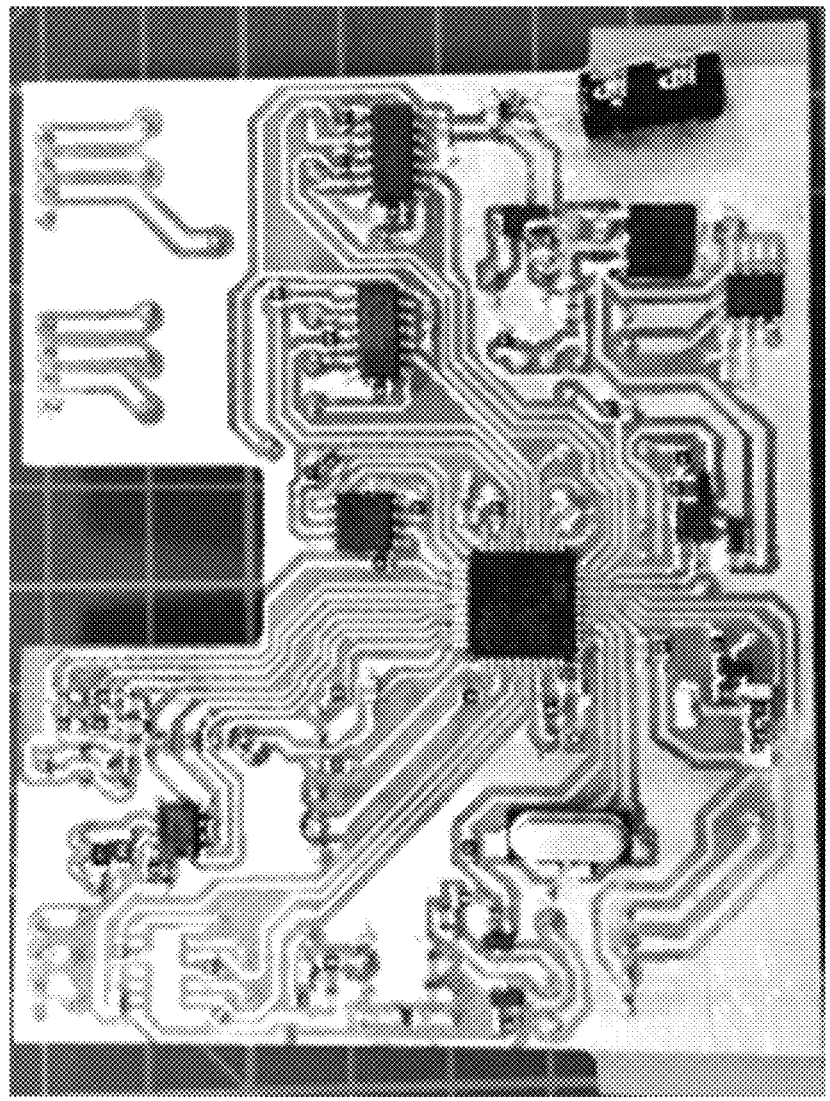

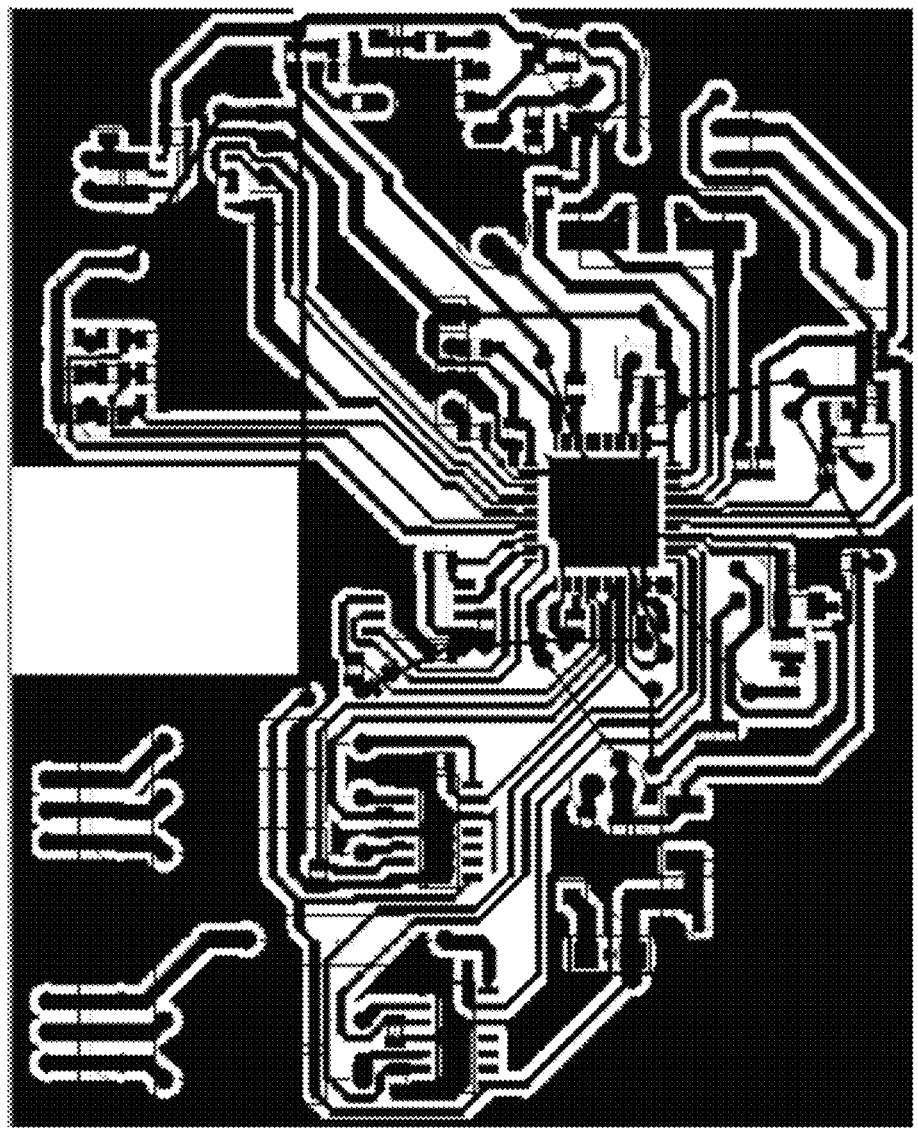

SCHEMATIC DIAGRAM OF CPU BOARD (3)

Resonance frequency in Helmholtz resonator is calculated by:

$$f = \frac{C_0}{2\pi}\sqrt{\frac{S}{VL}}$$

Where:
F – is the resonant frequency (Hz)
$C_0$ – speed of sound in air 340m/s
S – sectional area of the aperture, $m^2$
L – length of the aperture, m
V – volume of the resonator, $m^3$

FIG. 6A
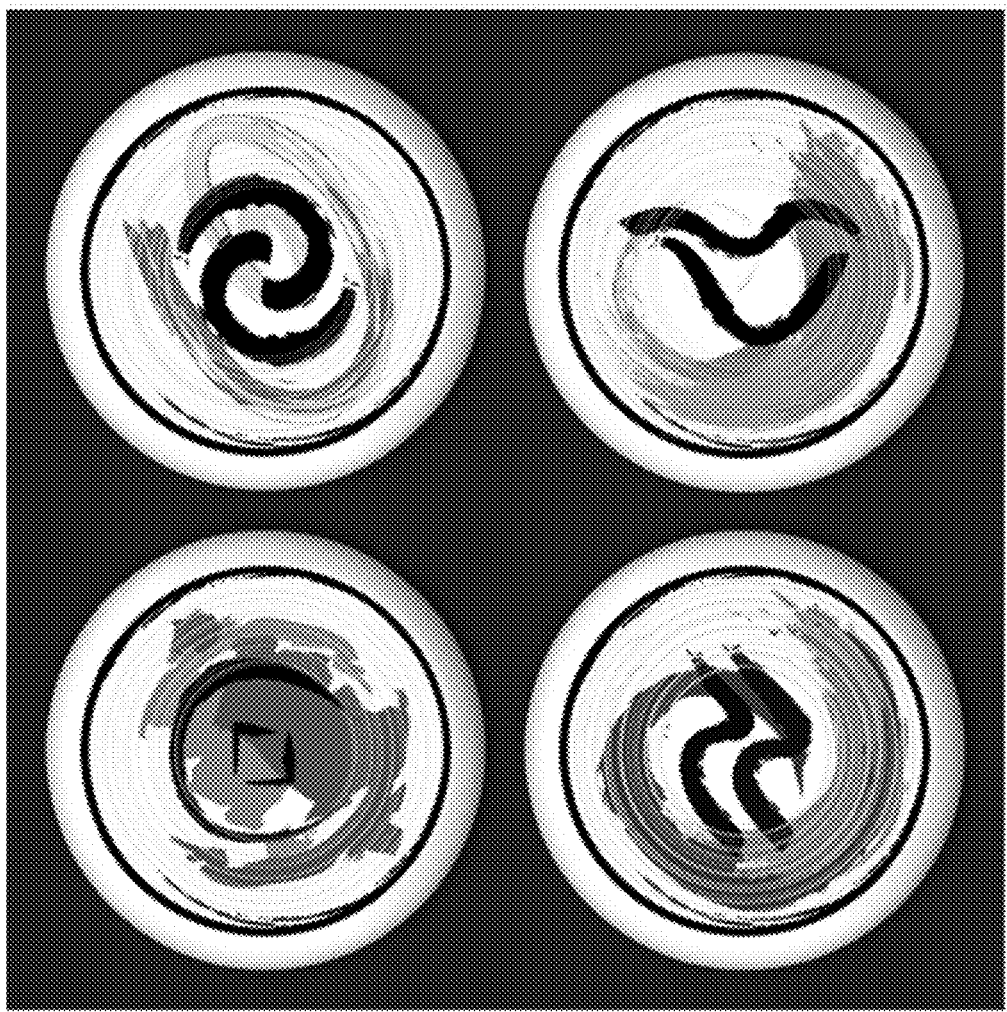
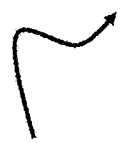
104

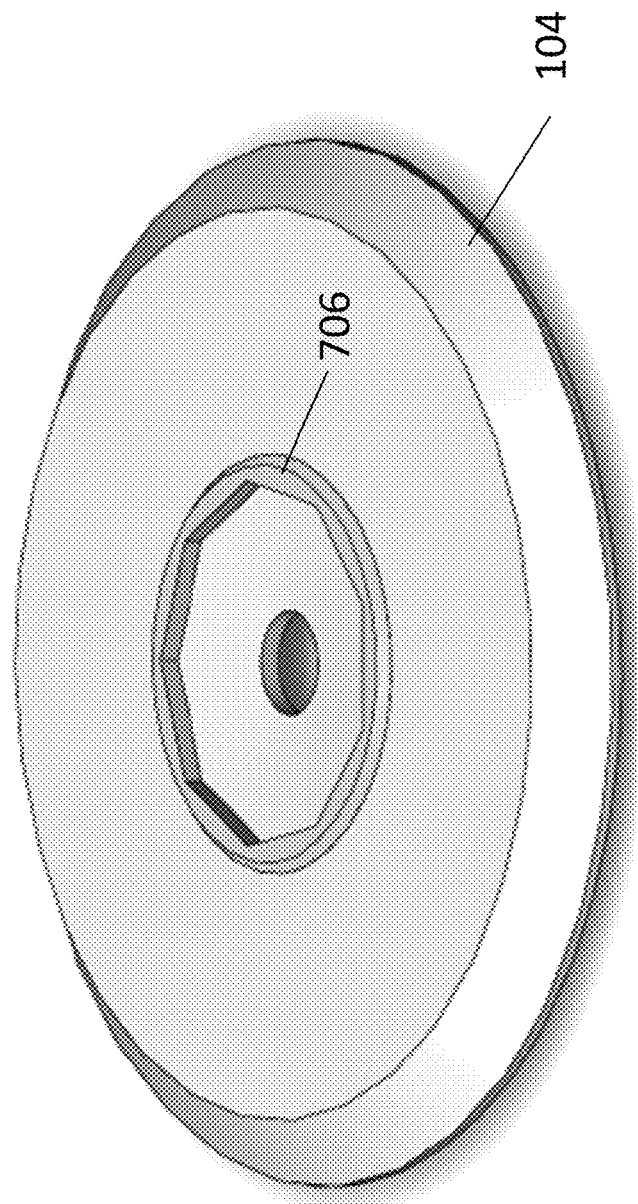

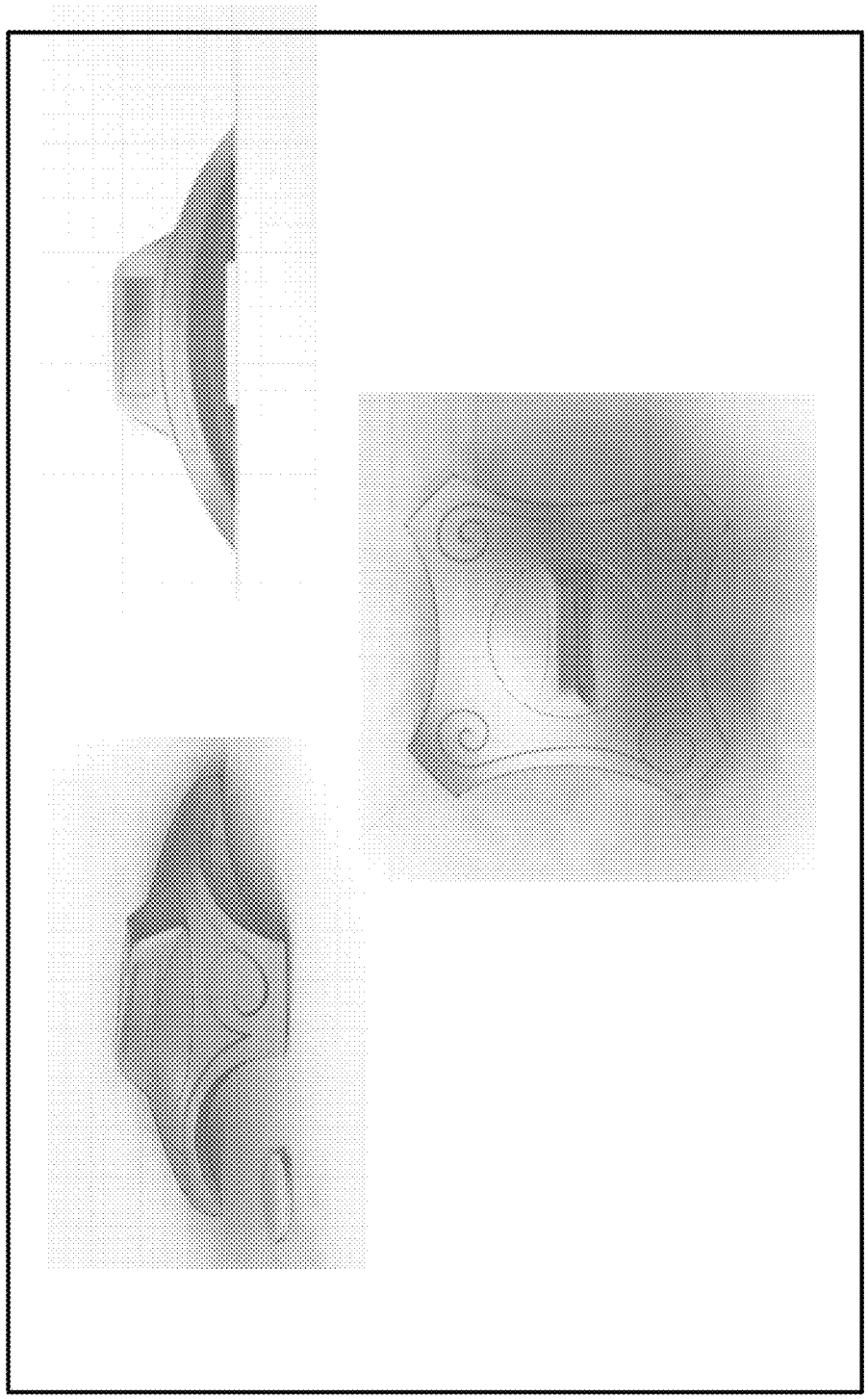

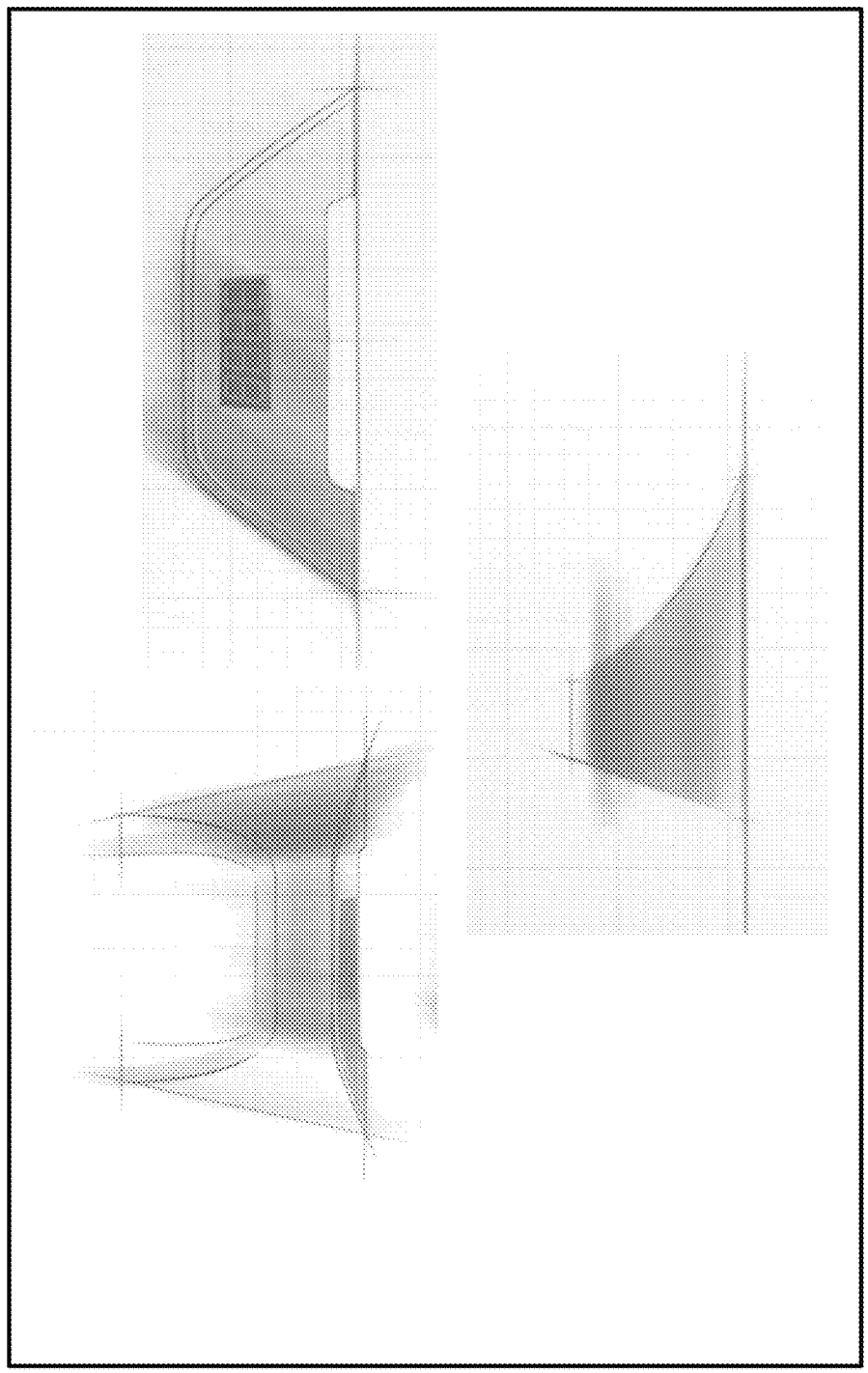

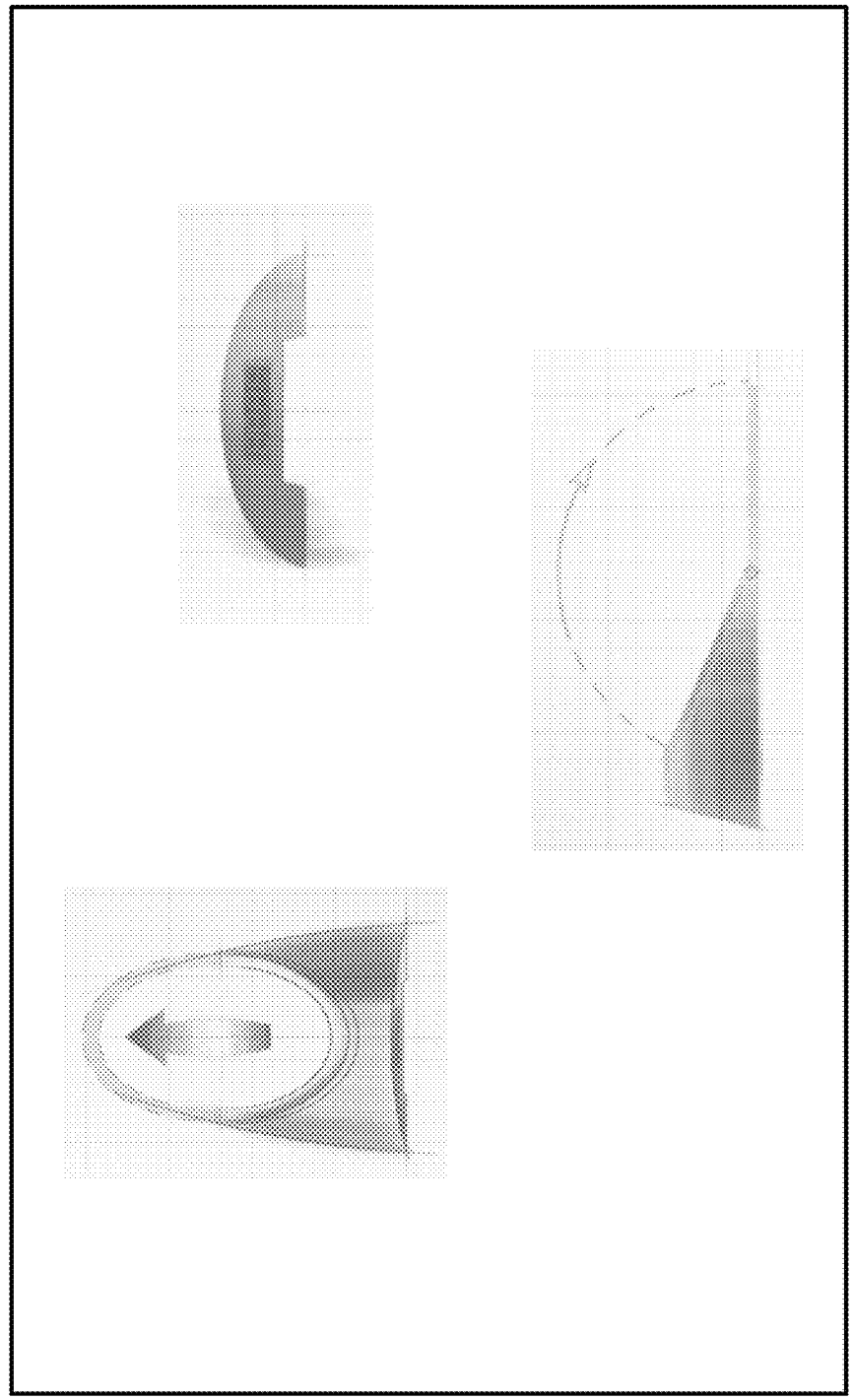

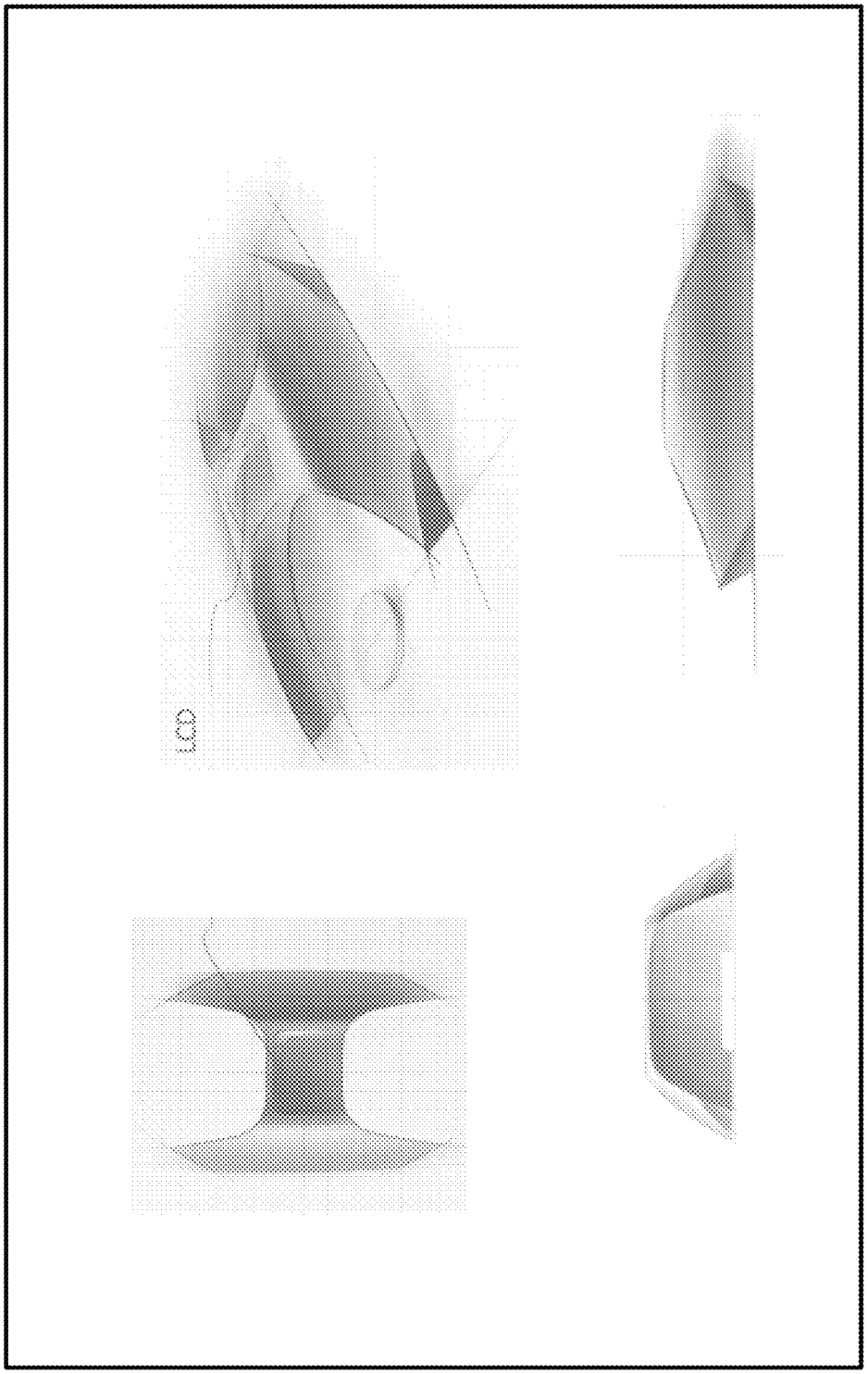

RULES

| Name | Element | Life Points | Defence against fire | Defence against earth | Defence against water | Name |
|---|---|---|---|---|---|---|
| Ori | Wind | 500 | 15% | 15% | 75% | 0% |
| NM | Earth | 450 | 10% | 0% | 10% | 50% |
| Lin | Water | 400 | 50% | 15% | 0% | 15% |
| Dark Lord | Fire | 600 | 25% | 75% | 0% | 0% |
| Dark Prince | Fire | 500 | 0% | 40% | 10% | 10% |

FIG. 10A

RULES

| Name | Amount of Life points | Amount of Life points | Amount of Life points | Amount of Life points | Amount of Life points | Amount of Life points |
|---|---|---|---|---|---|---|
| Ori | 100 | 200 | 300 | 400 | 450 | |
| NM | 100 | 200 | 300 | 400 | 450 | |
| Liv | 100 | 200 | 300 | 400 | 450 | |
| Dark Lord | 100 | 200 | 300 | 400 | 450 | 600 |
| Dark Prince | 100 | 200 | 300 | 400 | 500 | |

FIG. 10B

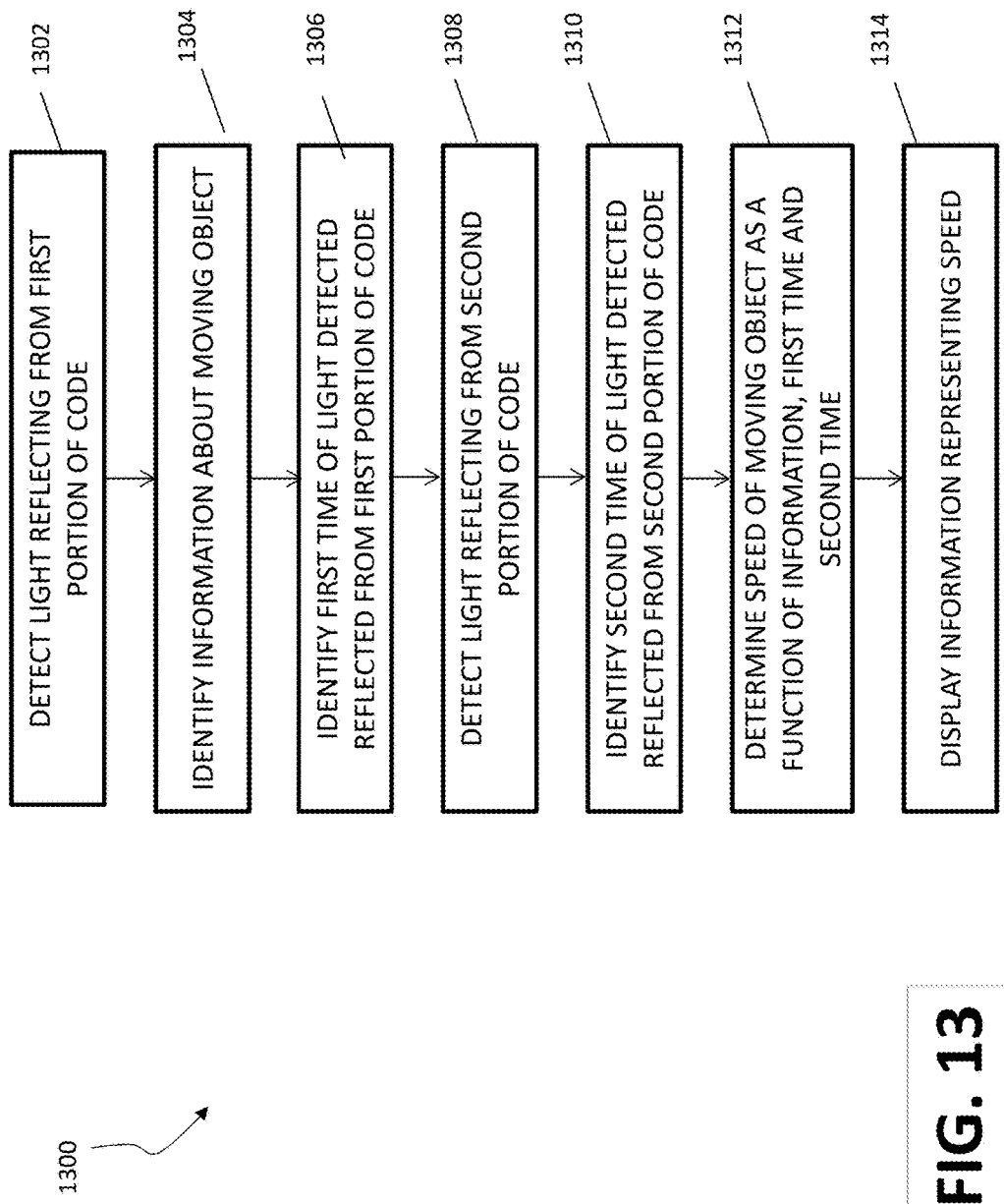

US 10,252,152 B2

MOVING OBJECT DETECTION SYSTEM AND METHOD

CROSS-REFERENCE TO RELATED PATENT APPLICATIONS

This application is based on and claims priority to U.S. Provisional Patent Application 62/115,017, filed Feb. 11, 2015, the entire contents of which is incorporated by reference herein as if expressly set forth in its respective entirety herein.

FIELD

The present application relates, generally, to systems and methods associated with detecting moving objects.

BACKGROUND

The increasing proliferation of mobile computing devices, such as smartphones, has resulted in users increasingly relying on such devices for recreational purposes, including for game playing. Accordingly, many electronic video games such as multi-player video games have overtaken traditional "physical" games, such as board games, in popularity. While electronic video games may provide many advantages over board games, such video games do not provide the same tangible, 'real world' gameplay experience, as reflected in certain board games through the use of figurines or gameplay pieces.

The present application addresses these and other considerations.

SUMMARY

In accordance with one or more implementations, disclosed is a code detecting system and method associated with moving objects. At least one light source is configured to provide light and at least one light sensor is configured to detect light respectively provided by the at least one light source, wherein the light reflects from a machine readable code supported by a surface of a moving object. At least one processor is configured as a function of executing instructions in non-transitory processor readable media, and a display is configured to display information from the at least one processor. Light from the at least one light source reflects from at least a first portion of the machine readable code as the object moves, and is detected by the at least one light sensor. Light from the at least one light source reflects from at least a second portion of the machine readable code as the object moves, and is detected by the at least one light sensor. The at least one processor determines information representing the moving object, a first time when the at least one sensor detects the light reflecting from the first portion of the machine readable code and a second time when the at least one sensor detects the light reflecting from the second portion of the machine readable code. The speed of the moving object is determined thereby and displayed.

These and other aspects, features, and advantages can be appreciated from the accompanying description of certain embodiments of the invention and the accompanying drawing figures and claims.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIGS. 1A and 1B are diagrams illustrating views of apparatus that includes a gate apparatus and game disc in accordance with an example implementation of the present application;

FIG. 2D illustrates an example multicolor light source, in accordance with an example implementation;

FIG. 2E illustrates an alternative implementation of a gate;

FIGS. 3A-3J illustrate example circuit boards and circuitry for controlling components in accordance with one or more example implementations;

FIGS. 6A and 6B illustrate example discs;

FIGS. 7A-7I illustrate example discs, including configured with colored gems, which c an be configured as wearable objects;

FIGS. 9A-9I illustrate example gates in accordance with one or more implementations of the present application;

FIGS. 10A and 10B illustrate example rules and values, in accordance with gameplay in accordance with an example implementation of the present application;

FIG. 13 is a flow diagram showing a routine that illustrates a broad aspect of a method for processing code(s) in accordance with at least one implementation disclosed herein.

DESCRIPTION OF THE EMBODIMENTS

Figure 1A:
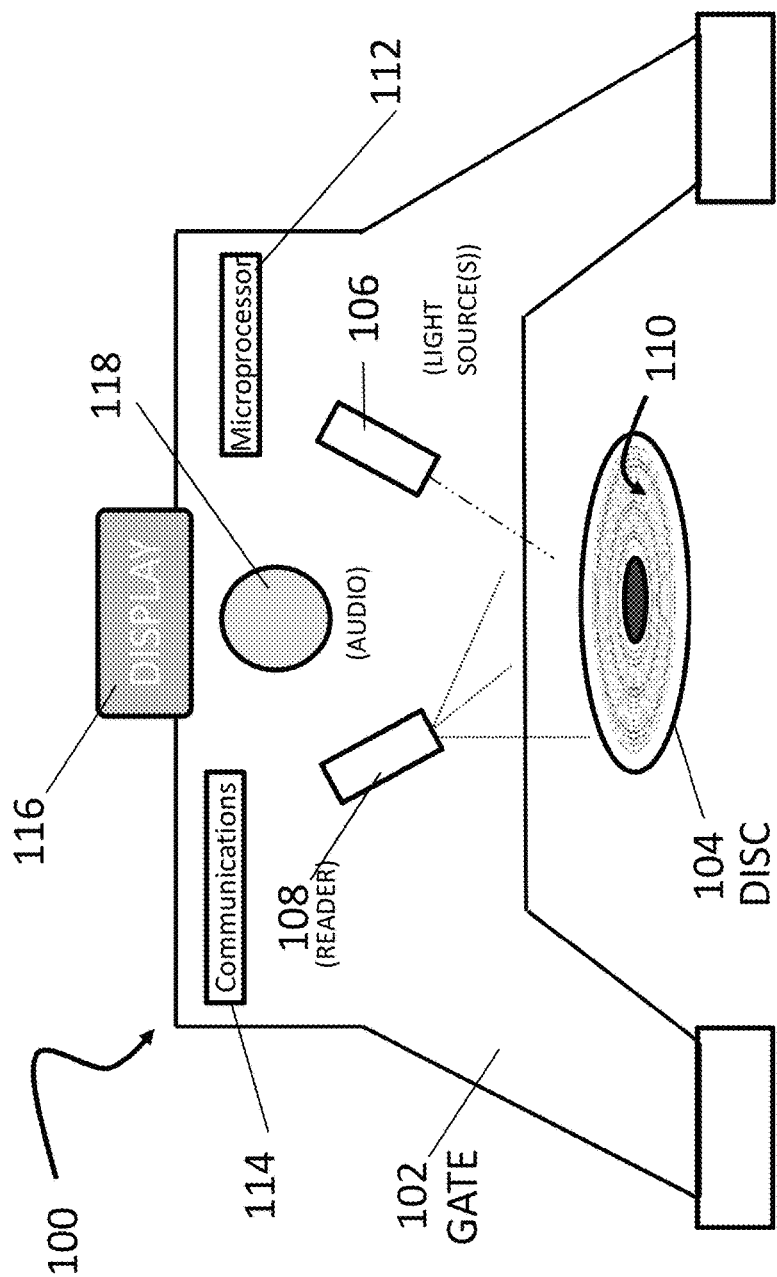

Various implementations of the present application include devices configured in an apparatus which can incorporate optics, one or more light sources, a sensor and a microprocessor, and an integrated or embedded machine-readable code that is provided with a projectile, such as a moving object formatted as a small game disc. The code can include a small amount of information, such as a few bytes or less (a few bits), and is detected and read by the microprocessor, as the disc or other object is in motion. In addition to reading information in the code, the speed of the projectile can be measured. Moreover, described herein are systems and methods for processing codes and respective speeds into instructions, which can be used, for example, in connection with a multi-player game.

The referenced systems and methods are now described more fully with reference to the accompanying drawings, in which like reference numerals refer to like elements and in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

FIG. 1A is a diagram illustrating a front view of example apparatus 100 that includes a gate apparatus 102 and game disc 104 in accordance with an example implementation of the present application. Gate 102 can be configured as one solid item, or, alternatively, a plurality of gates that open and close. The gate apparatus 102 shown in FIG. 1A is configured with one or more light sources 106 that can emit light, and one or more photoreceptors or other light sensing component(s) 108 that detect the light emitted from the light source as the light is reflected from the disc 104 or other moving object having an integrated or embedded code 110. In addition or in the alternative to a laser 108, other light sources can be provided, such as infrared ("IR"), ultraviolet ("UV") and light-emitting diode ("LED"). Moreover, the light source 108 may be configured to include light pipes and/or fiber-optics in order to focus the light in particular ways. In one or more implementations, light is projected at a plurality of locations, such as at two locations in a gate-like structure, which assists with speed detection and measurement. The light emitted thereby reflects from the code 110 and is received by sensor(s) (e.g., photoreceptor) 108, thereby enabling the machine-readable code 110 to be perceived by a microprocessor 112.

Figure 11:
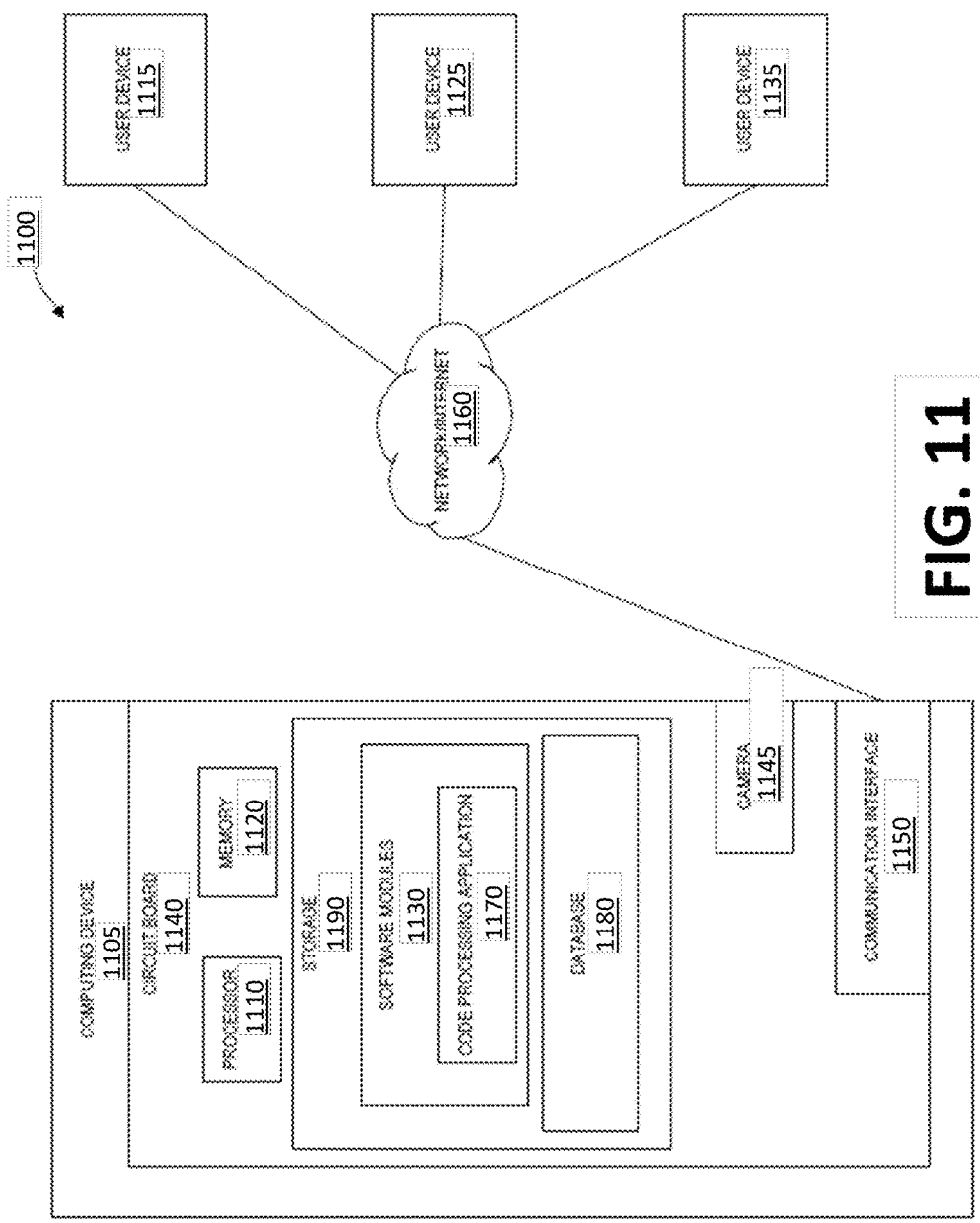
FIG. 11 illustrates an exemplary computer system and shown as a block diagram.

Further, gate 102 can be configured with a communications interface 114 that enables communication with one or more remote computing devices through a computer network, such as the Internet 260 (FIG. 11). Information associated with a respective game disc 104 that is detected by the microprocessor 112 can be provided to and from a remote computing device. For example, player information, gameplay information and other information can be sent to and/or received from a remote computing device and used by microprocessor 112 in various implementations, for example, during gameplay, following detection of code 110.

Moreover, the example implementation shown in FIG. 1A includes a display 116 that is coupled to gate 102. Display 116 can be configured to display various kinds of information, such as the respective disc 104 being detected and the speed of the disc 104 as it passes through the gate 102. Various gameplay content, including information and image content can be displayed on display 116, such as current player name, points accrued, team information, instant replays or the like. Moreover, gate 102 can be configured with one or more audio components, including one or more speakers 118, and for audibly providing various kinds of sounds. For example, sound effects (e.g., bells, explosions, crowd cheering, or virtually any other sound) and various kinds of information (e.g., scores, player names, teams, gameplay and/or virtually any audible content) can emit from speaker(s) 118 before, during and/or after gameplay.

FIG. 1B is a diagram illustrating a side view of apparatus 100 that includes an example gate apparatus 102 and game disc 104 in accordance with an implementation of the present application. In the example shown in FIG. 1B, gate apparatus 102 is configured with two respective light sources 106 and two respective sensors 108. In operation, for example, game disc 104 including code 110 is read once as light reflect from a first respective light source 106 is detected by a respective sensor 108 and the time when the code is read is determined. Thereafter, the game disc 104 including the code 110 is read a second time as light reflect from a respective light source 106 (which may be the same or a different light source 106) is detected by a respective sensor 108 (which may be the same or a different sensor 108) and the time when the code 110 is read the second time is determined. Thereafter, the microprocessor measures the amount of time between the respective reads and, using information associated with the disc 104 (e.g., the diameter of the disc), the speed of the game disc 104 is determined by the microprocessor 112. Thus, the microprocessor 112 is configured to execute code to detect the specific disc 104 (as a function of its code 110), to measure time associated with the movement of the disc 104 and to calculate the speed of the disc 104 as it moves.

A two-sensor system, such as shown and described above with regard to FIG. 1B, enables receiving four results from reading a code 110 from a single disc 104. This provides accurate reading of up to 12 bits of data or more.

Thus, in one or more implementations, code-reading is based on an optical method. For example, the source of the light (e.g., a laser beam) is constant, and a phototransistor which can be a common red or near infrared phototransistor (or other sensor sensor) receives the reflected beam. When the beam of light hits the code, the light is reflected to and received by the sensor, and a microcontroller reads the code.

The code 110 provided with the disc 104 can be printed in concentric circles of different widths. The circles can be printed in different widths, with a broad width representing the value 0, and a narrow width representing the value 1, such as provided in traditional 1-D barcodes. The microcontroller reads ones and zeroes and stores them in the RAM. After reading is complete, data are processed. In one or more implementations, the first stripe provides some information about the width of a bar representing the value ONE.

In one implementation, the circle code is printed with black ink on a white paper. However, the code itself is the blank space between the black circles. The black circles are printed only to distinguish between bits. The laser beam crosses the black stripes and it is absorbed by them. The white stripes reflect the light into the sensor. The least significant bit (LSB) comes first.

Figure 2A:
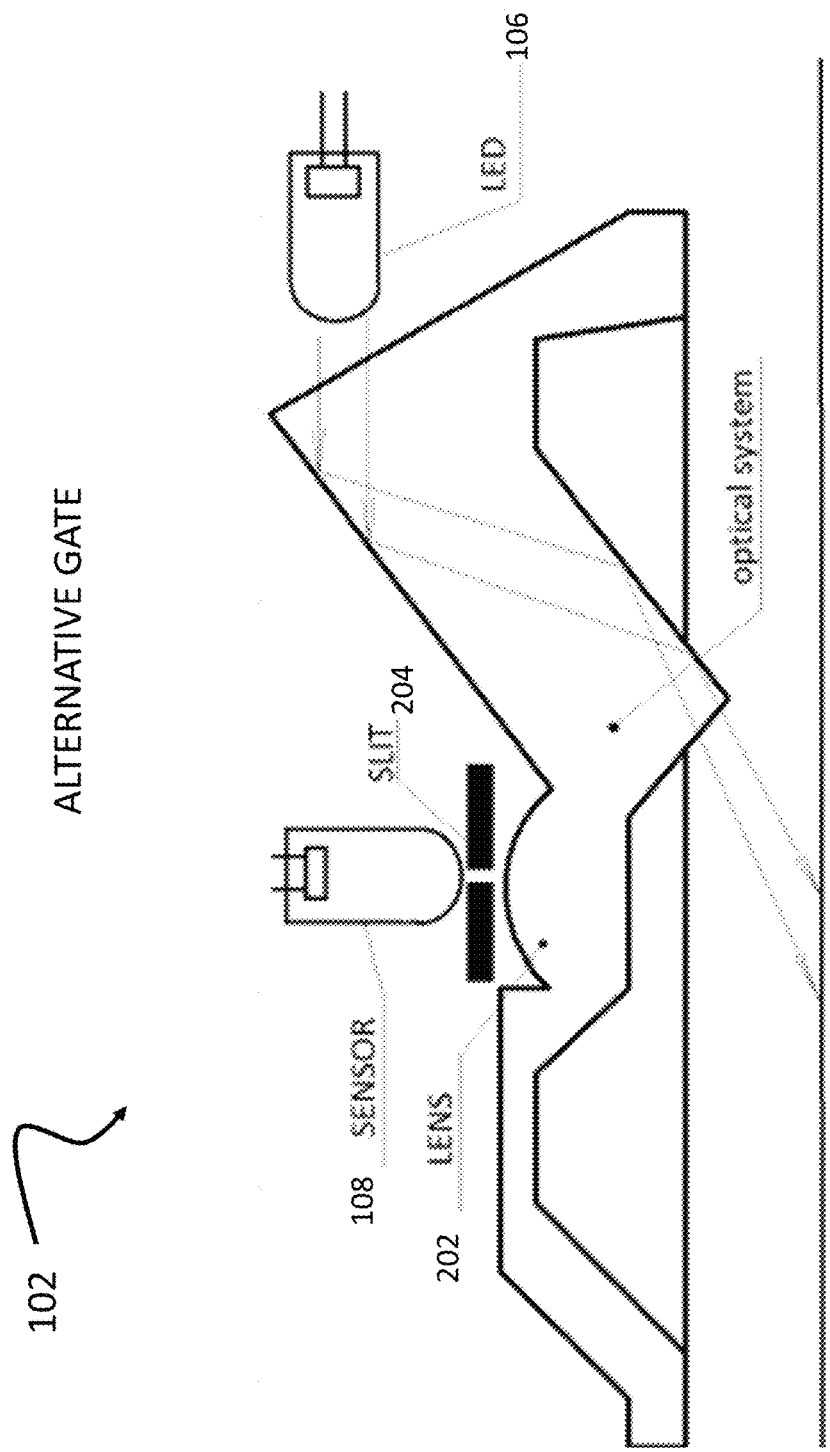
FIG. 2A illustrates an alternative example gate that includes an LED light source and lens.
Figure 2B:
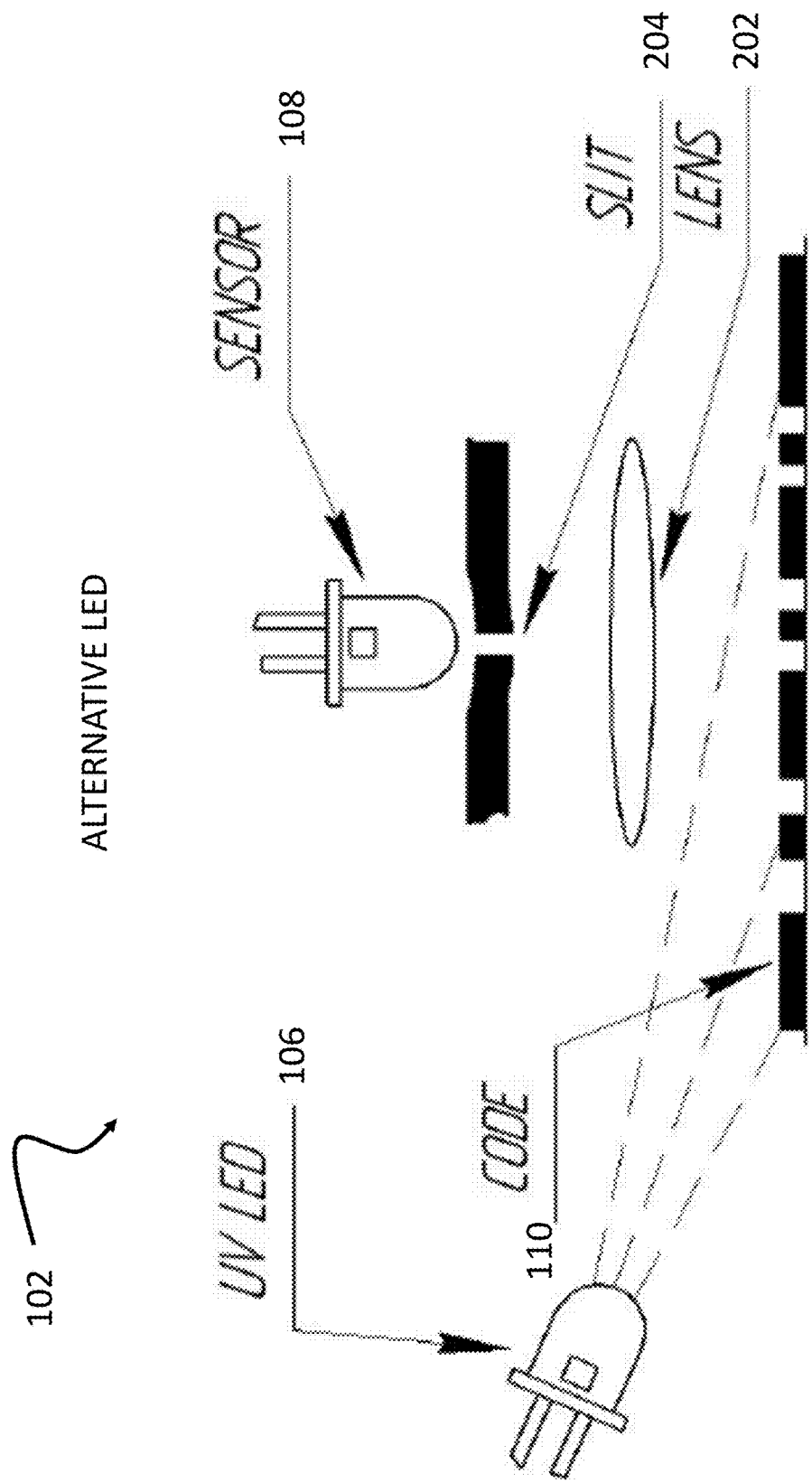
FIG. 2B illustrates components included in the alternative gate and further illustrates a code.

FIG. 2A illustrates an alternative example gate 102 that includes an LED light source 106, and further includes a low-cost lens 202, such as may be provided with an optical mouse (selection device). An example lens of this type includes a ZAMG-30 Mouse Lens. In addition to lens 202, the alternative gate 102 illustrated in FIG. 2A includes a slit 204, which can, for example, provide a narrowing of light to be detected by the sensor 108. Moreover, by including two (or more) sensors (FIG. 1B), information can be compared and errors (to the extent there are any) eliminated. FIG. 2B illustrates components included in the alternative gate 102 illustrated in FIG. 2A, and further illustrates the code 110 (provided on disc 104) that is read by the microprocessor 112 following detection by sensor 108 of the reflected light from code 110. Design modifications are supported herein, such as by modifying the width of the slit 204 and/or selecting a different lens 202 to increase the number of bits read from the code 110.

Figure 2C:
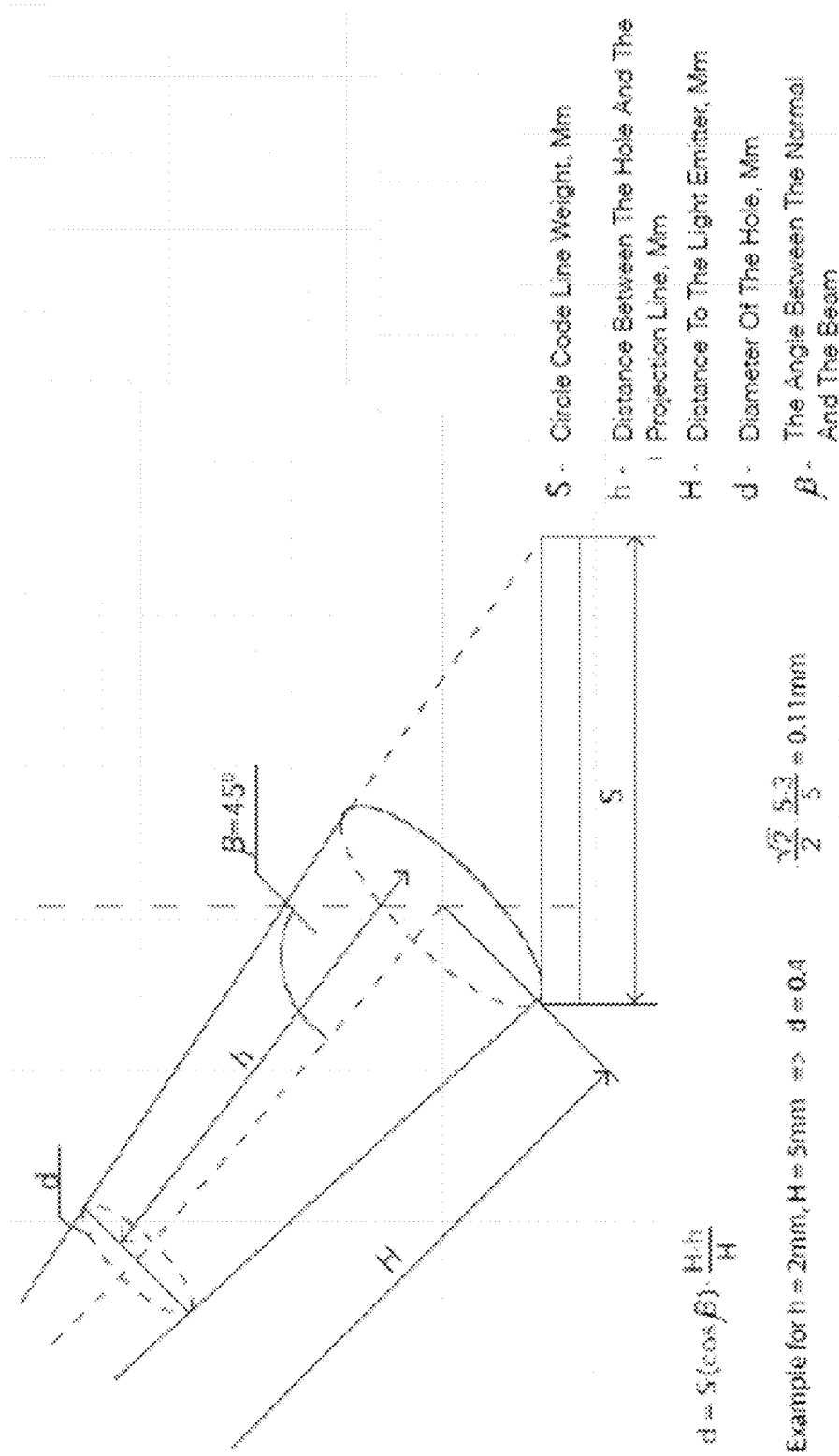
FIG. 2C illustrates an alternative reader in accordance with an implementation of the present application.
Figure 3B:
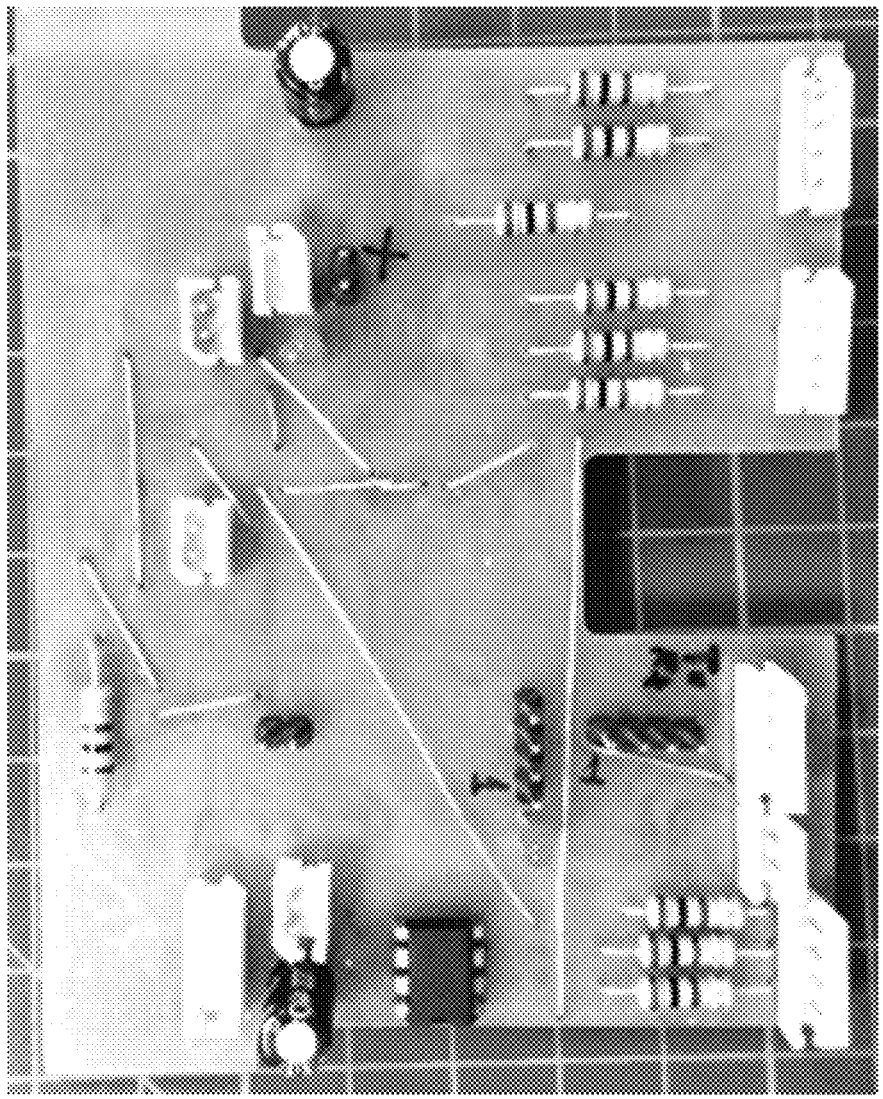
Figure 3D:
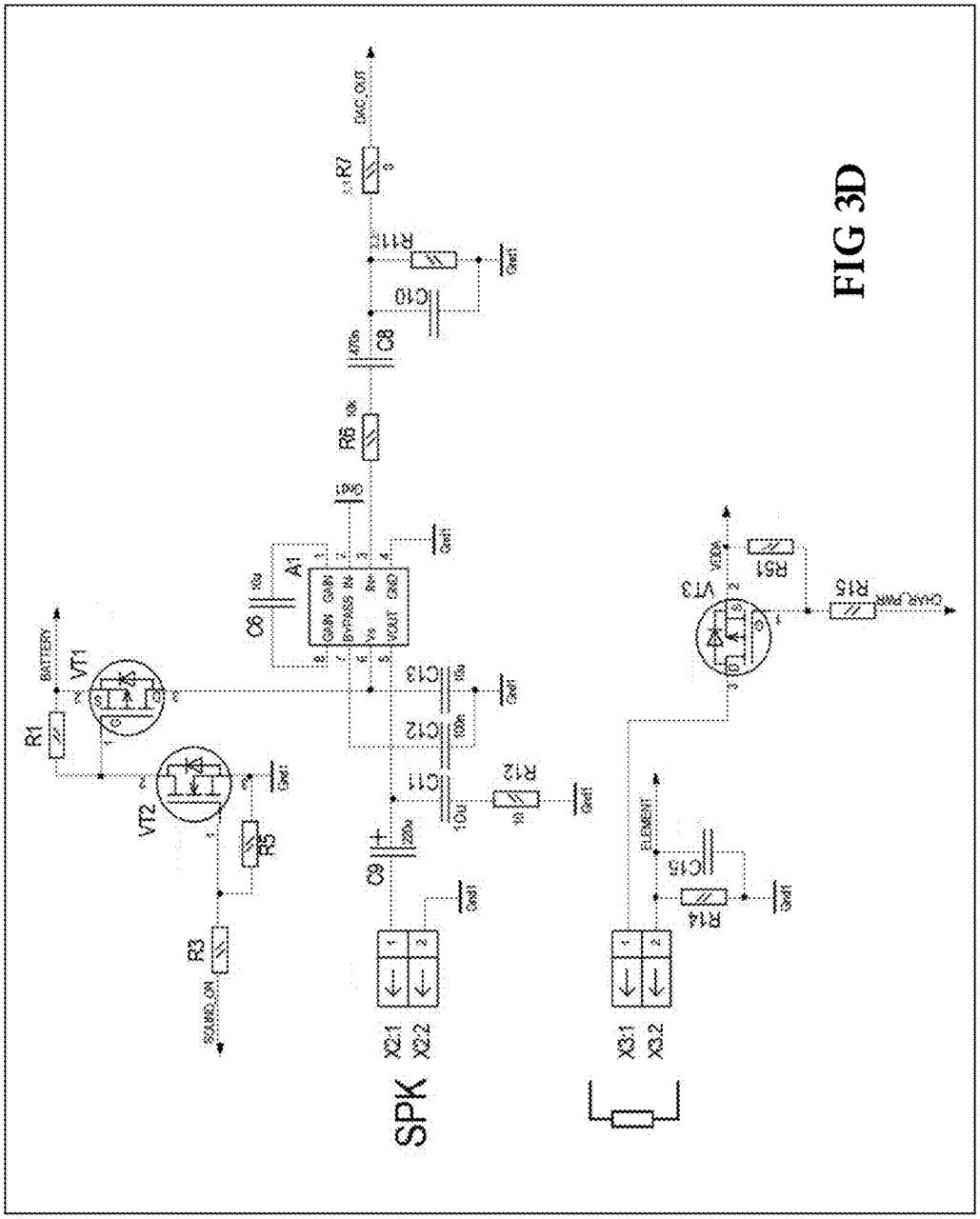
Figure 3E:
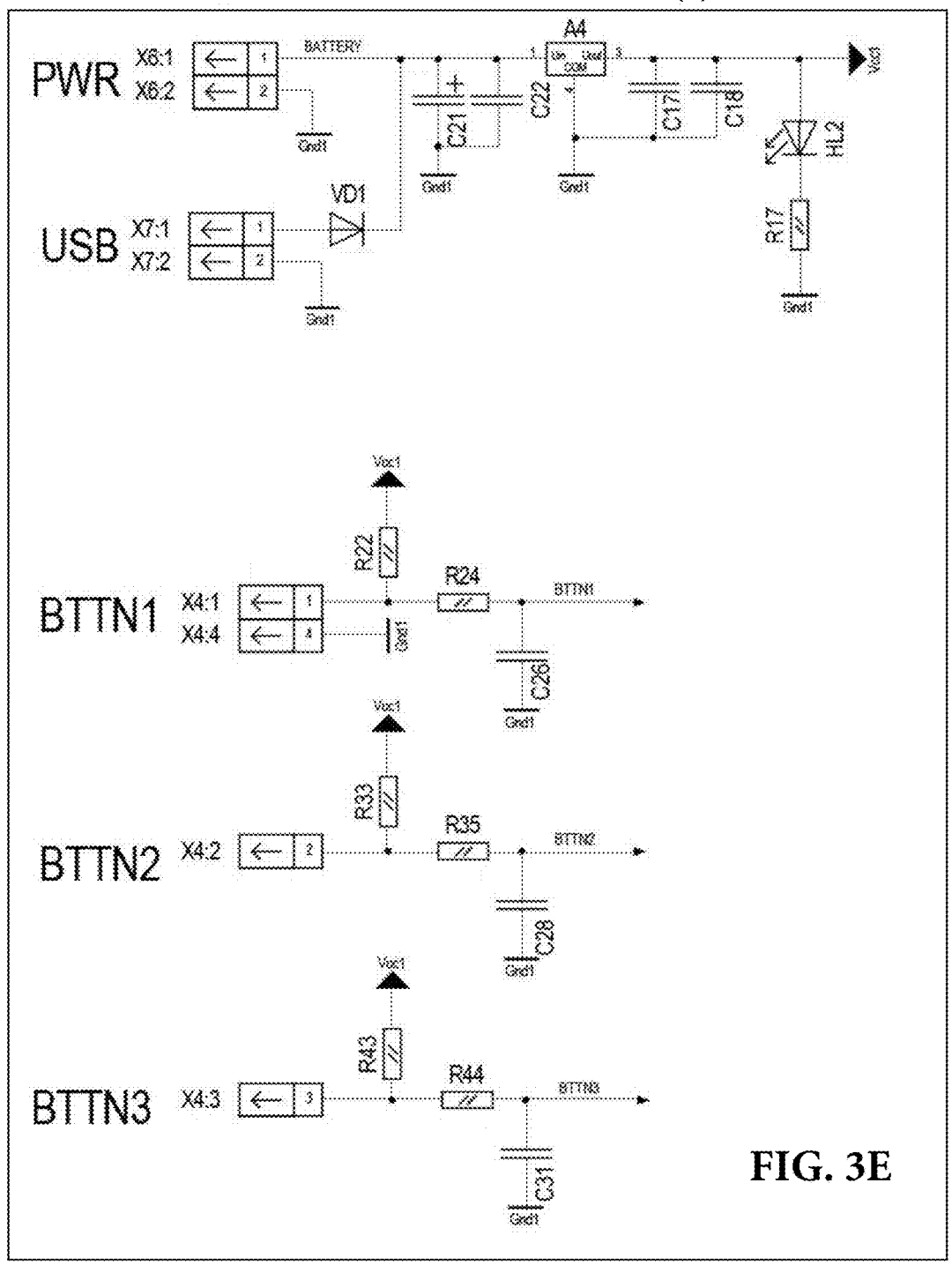
Figure 3F:
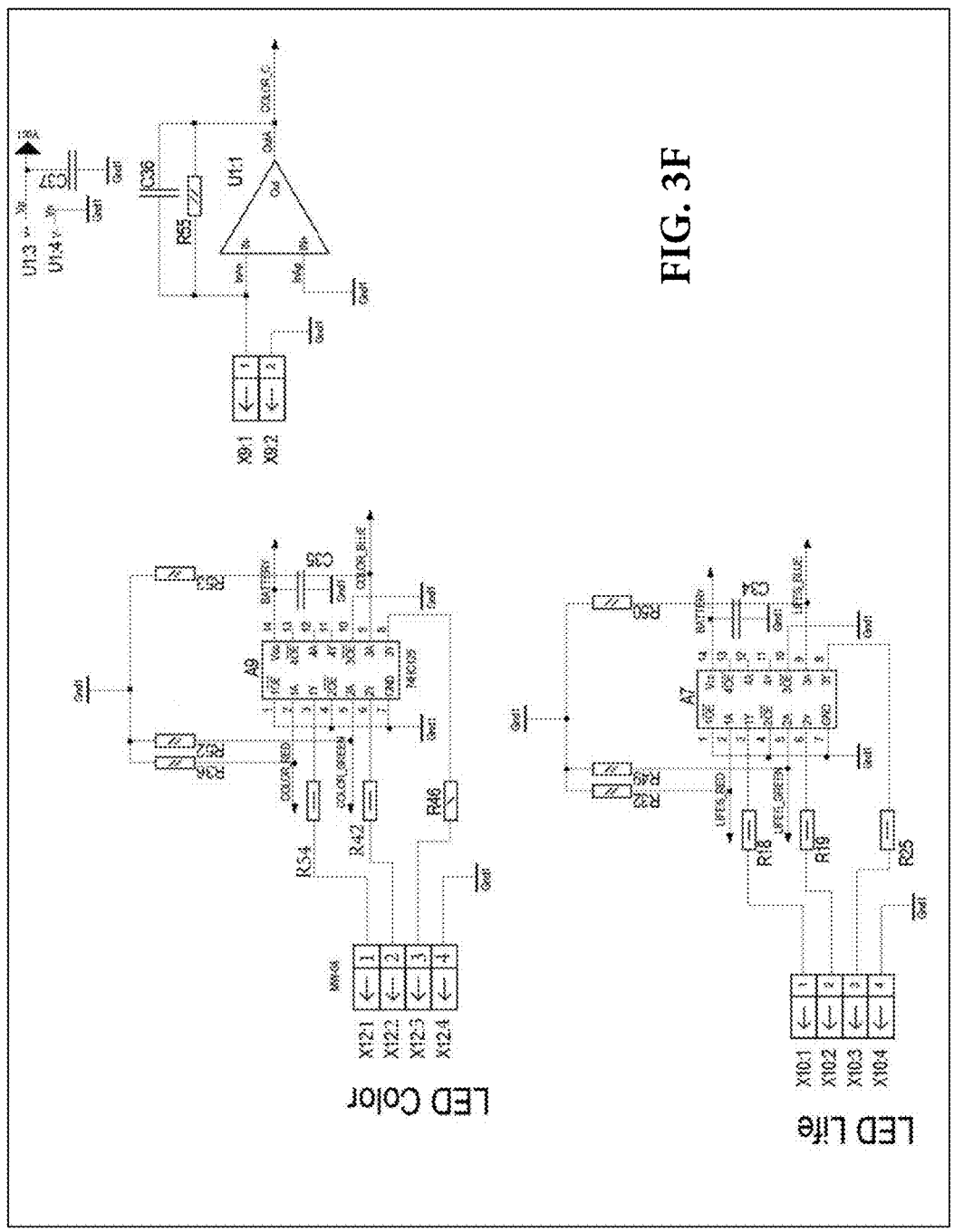
Figure 3G:
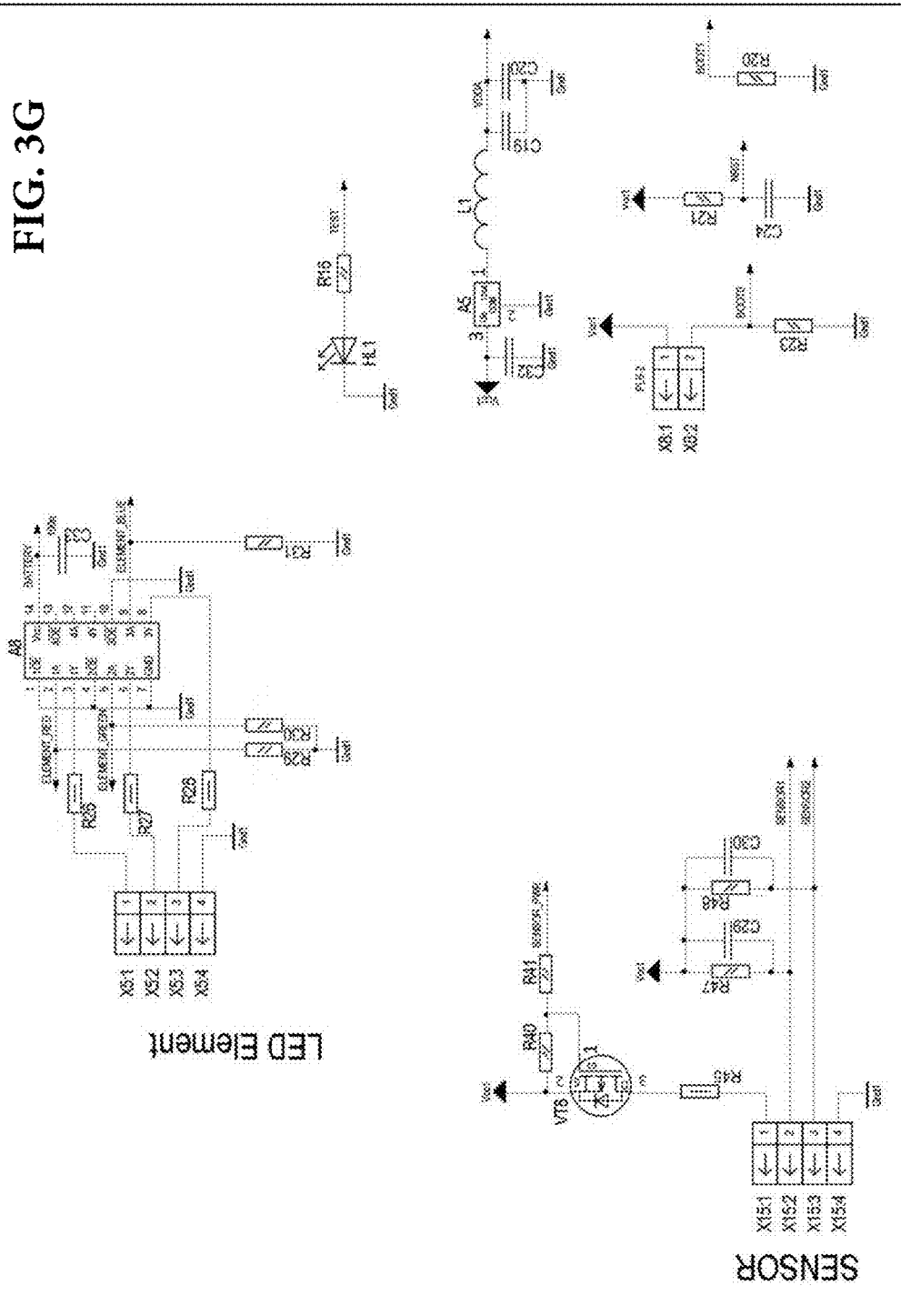
Figure 3H:
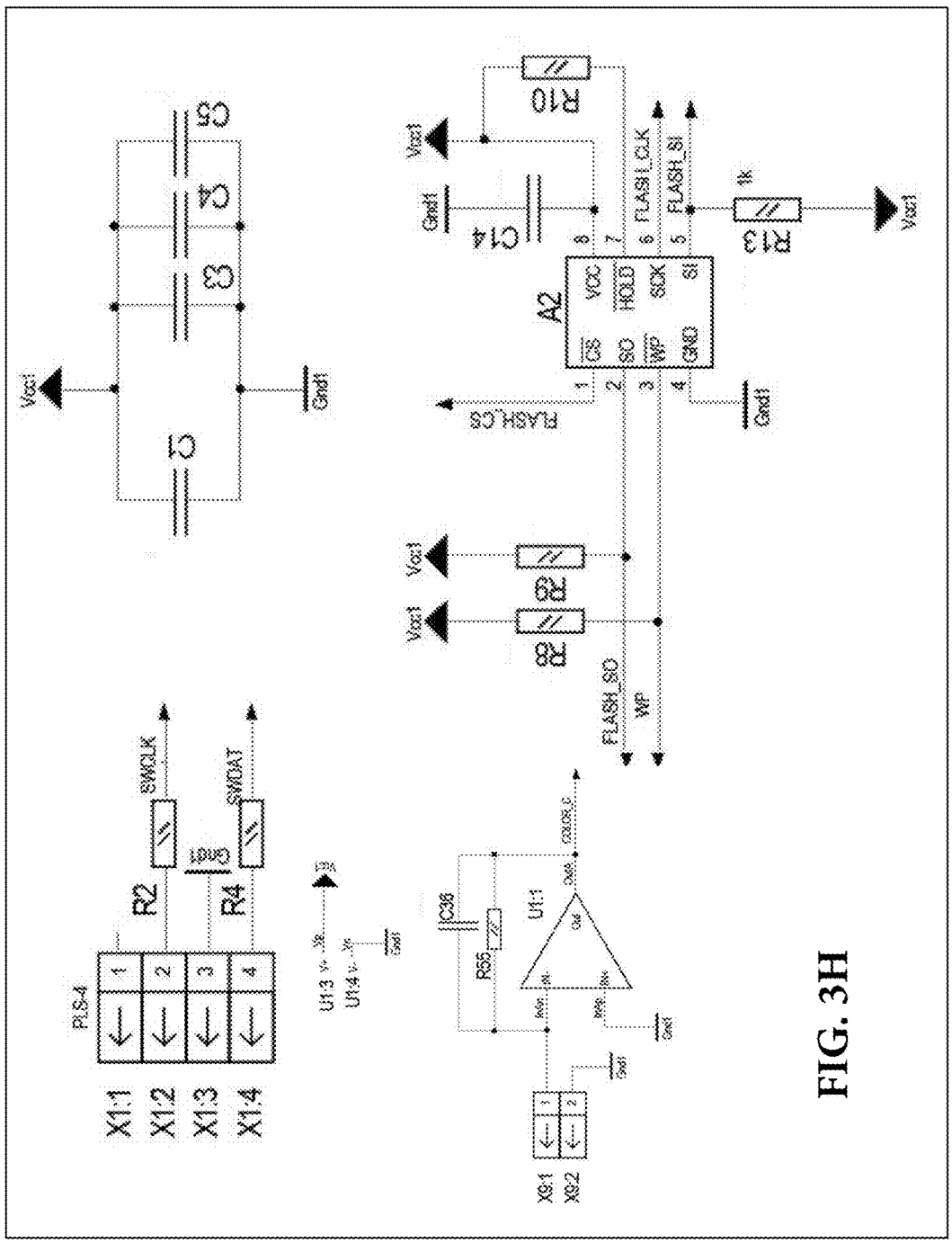
Figure 3I:
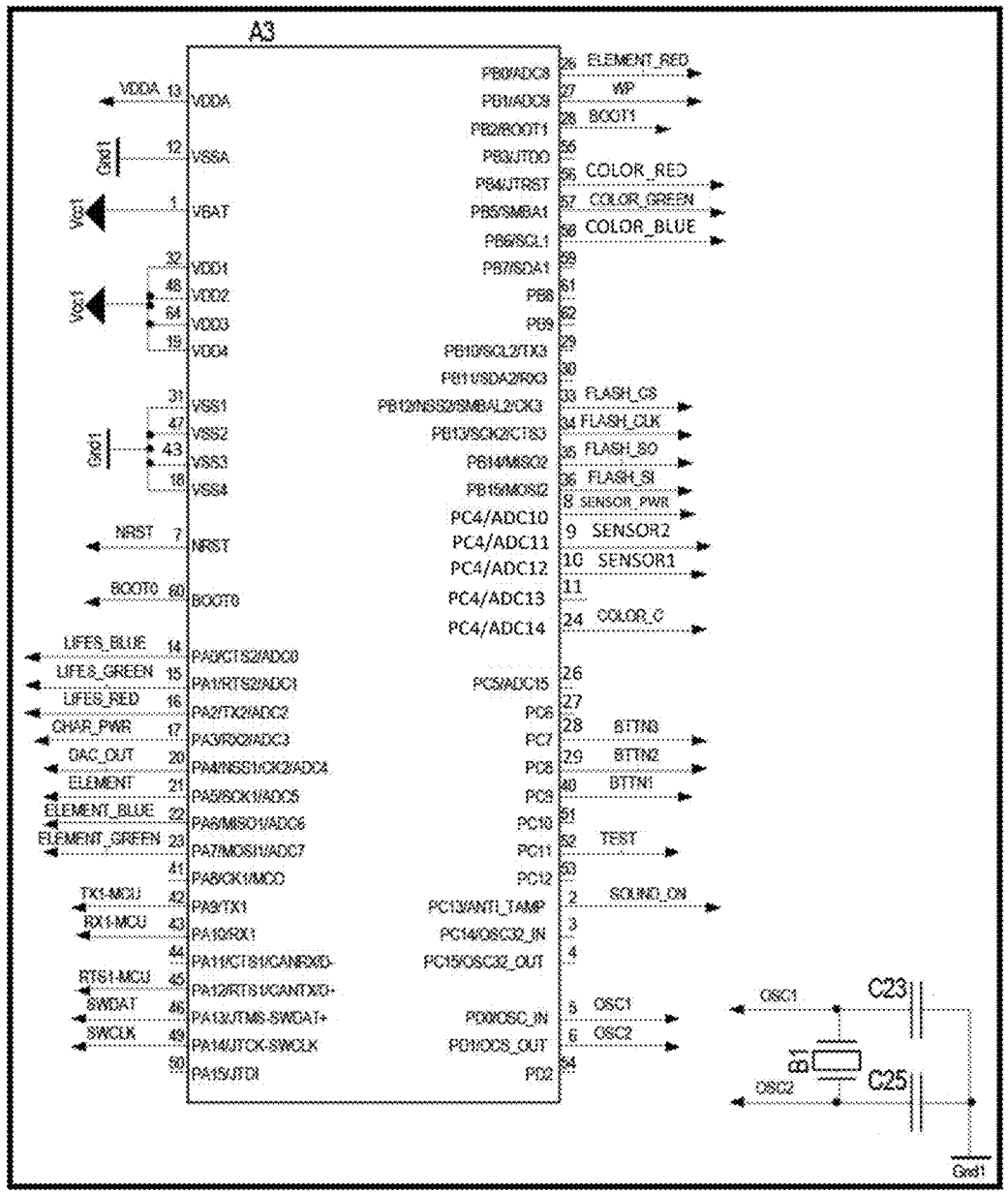
Figure 3J:
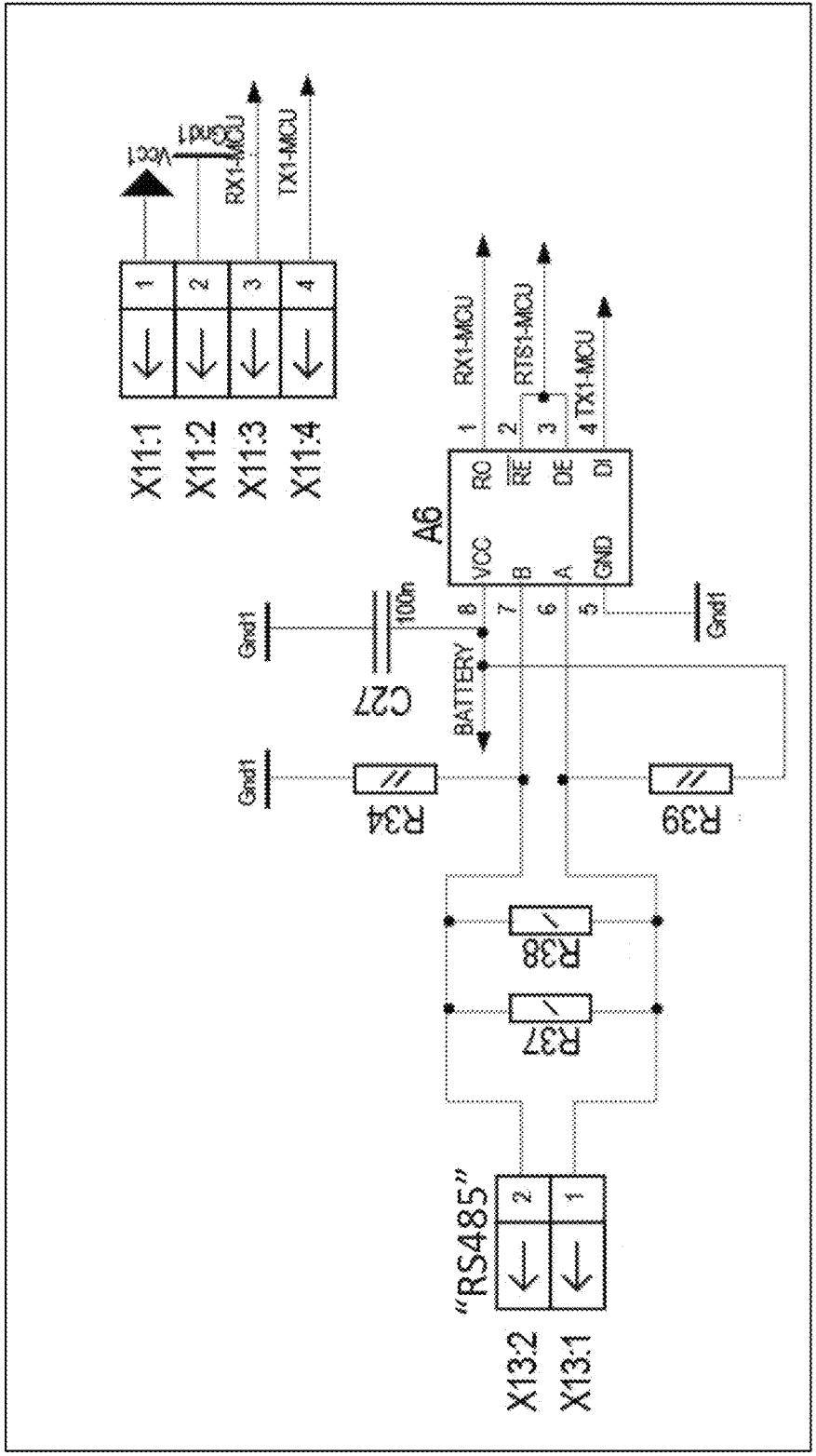

In an alternative reader, as shown in FIG. 2C, a structure is provided that narrows the beam of light, so that the beginning and the end of the code lines of code 110 can be detected. To achieve this, the diameter of the aperture is calculated to restrict the sensor. Moreover and in the implementation shown in FIG. 2C, the minimal distance from the hole to the disc is less than 2 millimeters. In the example shown in FIG. 2C, the variables S represents the Circle Code Line Weight, in mm, h represents the Distance Between The Hole And The Projection Line, in mm, the letter H represents the Distance To The Light Emitter, in mm, the letter d represents the Diameter Of The Hole, in mm, and the letter β represents The Angle Between The Normal And The Beam. Accordingly, $$d = S(\cos\beta) \cdot \frac{H \cdot h}{H}.$$

Example for $$h = 2 \text{ mm}, H = 5 \text{ mm} => d = 0.4 \frac{\sqrt{2}}{2} \frac{5.3}{5} = 0.11 \text{ mm}$$

In one or more implementations of the present application, discs 104 can be provided with codes 110 that are configured with color. For example and as discussed in greater detail herein, translucent colored components that can be configured to appear as gems can be included with disc 104, which provide color associated with the code. Accordingly, gate 102 can be configured with a module for color identification. In one implementation, and as shown in FIG. 2D, a multicolor LED is configured as light source 106. As the reflected light from the multicolor LED 106 passes the colored surface, the sensor 108 can detect the color of the gem.

In yet another alternative implementation shown in FIG. 2E, technology associated with radio frequency identification (RFID) is incorporated in the disc 104 and gate 102. For example, an RFID chip can be integrated with disc 104 that provides, for example, information about the disc 104. Such information can include a unique identifier of the disc. Further, an RFID terminal can be integrated with gate 102 and operable to identify the type of disc. Also included in the example implementation shown in FIG. 2E, LED 106 and optical sensor 108 contribute to the detection of the speed of the disc 104, such as shown and described herein. Further, processor 112 is illustrated that calculates information associated with the disc, such as the speed of the disc and other information associated with the disc 104.

FIGS. 3A-3J illustrate example circuit boards and circuitry for controlling components in accordance with an example implementation. For example, example circuit boards, printed circuit board (PCB) routings of a central processing unit (CPU) board, and schematic diagrams of example CPU boards are illustrated, in accordance with example implementations of the present application.

Figure 4A:
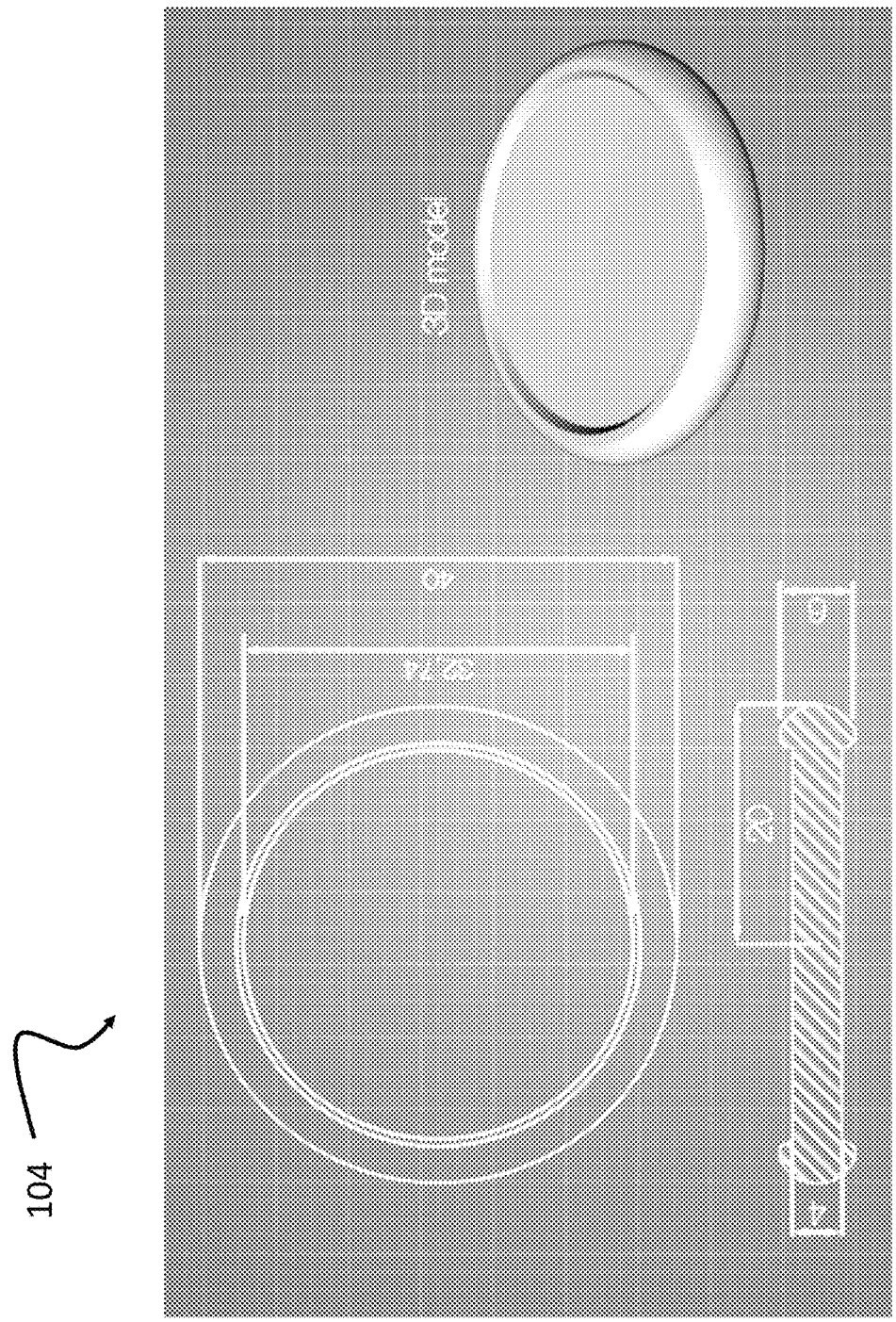
FIGS. 4A-4H illustrate example discs and accessories in accordance with one or more respective implementations of the present patent application.

FIGS. 4A-4H illustrate example discs 104 and accessories in accordance with one or more respective implementations of the present patent application. As illustrated in one or more of FIGS. 4A-4H, discs 104 can be configured in various sizes, weights and shapes, can be decorated in various ways and can be configured with one or more accessories. FIG. 4A illustrates a 3D model of a disc 104 that includes convex sides of the disc 104, which can increase the speed of the disc 104, for example, during gameplay. In one or more implementations, the weight of the discs 104 is between 6 and 7 grams, which is light enough not to hurt children and yet heavy enough for a suitable speed of movement.

Figure 4B:
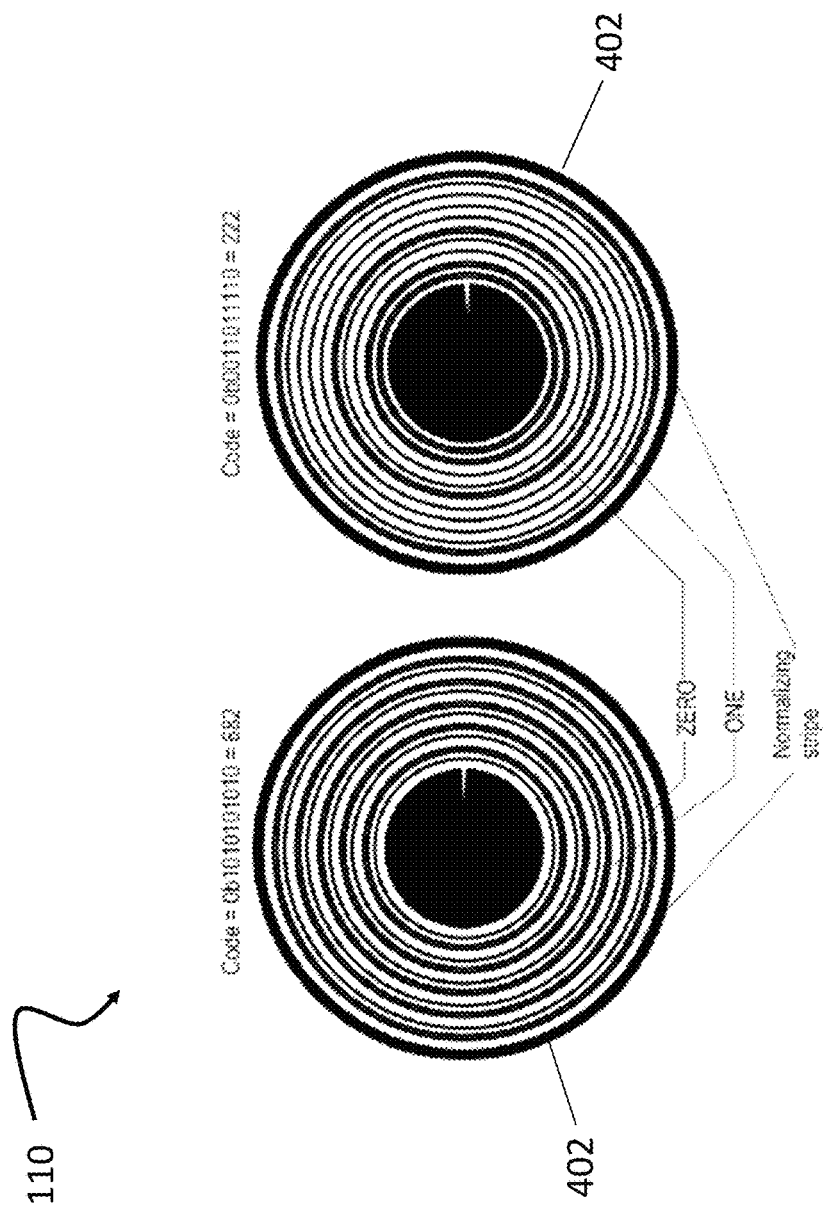

FIG. 4B illustrates two example codes 110 that are provided with disc 104. The codes 110 respectively represent two discs 104, and include code information identifying each of the respective discs. In the example shown in FIG. 4B, one disc 104 is identified with a value 682, and the other disc 104 is identified with a value 222. The values are encoded in a circular barcode, and zeros and ones encoded therein are identified by respective weights of the circular bars. Also shown in FIG. 4B is a normalizing stripe 402, that is used in the code detection process.

In one or more implementations, a circle-code reading algorithm is applied that employs an internal timer, which can run at 100 kHz speed. This timer generates an internal interrupt and regularly reads information from sensor. These samples are stored in the buffer for future processing. In one implementation, a typical buffer content for code 682 (FIG. 4B) is the following: (18), 9, 19, 9, 18, 10, 19, 8, 17, 7, 20, 19, 8, 20, 7, 18, 8, 19, 8, 19, 8, 21. The code can contain two sets of data as the code is read twice. After the buffer is full, an internal flag can be set (e.g., "End of Reading" flag), and code analysis begins. The first number (18) is normal ONE. If any other number is less than 0.75 of normal ONE, then it is ZERO, otherwise it is ONE. So, the binary data results in: (1), 0, 1, 0, 1, 0, 1, 0, 1, 0, 1, 1, 0, 1, 0, 1, 0, 1, 0, 1, 0, 1. LSB first, last bit is ignored. The code is 0b1010101010=682. After the code is processed, the program empties internal buffers.

Figure 4C:
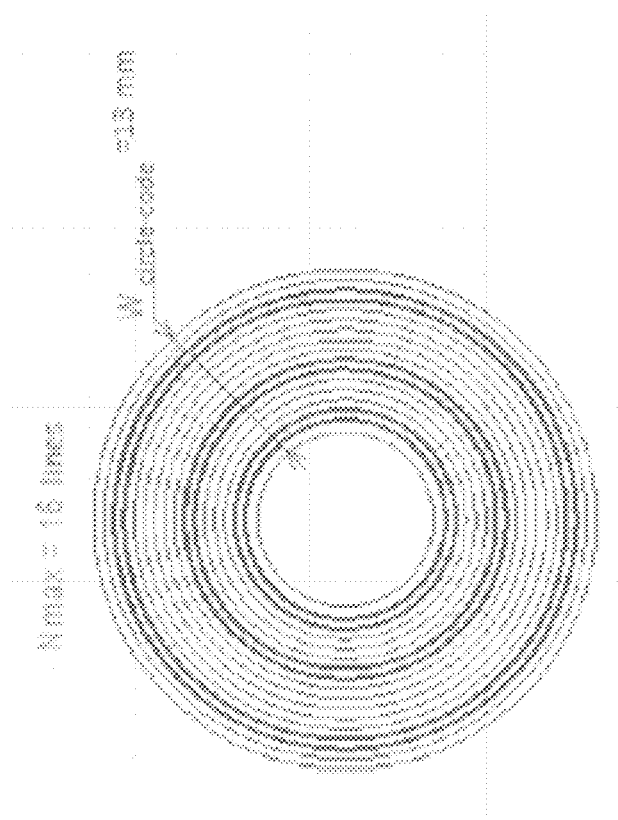

The amount of information placed on the disc 104 can be proportional to the width of the circle-code 110 and its density. A dense circle code is illustrated in FIG. 4C. Each component can be chosen based on the condition of reliable reading of the code 110. Reliable reading can be based on the following factors: The circle-code is placed on the disc so that any position of the disc in the gate is supported and in case of any displacement of the center of the disc relative to the axis line the bar code 110 is capable of being scanned by one optical coupler. Moreover, the density of the application of the circle-code preferably does not exceed the admissible velocity of scanning, at the highest velocity of the disc 104. The density of application of the circle-code 110 may be restricted by the capability to focus the incident ray of the LED (or the reflected ray falling into the optical transistor). Furthermore, the density of the circle-code 110 may be restricted by the possible alteration of the velocity of the disc (deceleration).

For example and with specific reference to the code 110 shown in FIG. 4C, input data can include: Dd—diameter of the disc, m; Dd=0.04 m WG—width of the gate, m; WG=0.052 m VMAX—maximum velocity of the disc, m/s VMAX=6 m/s Define:Wcircle-code—width of the circle-code W. Based on the gate diameter and the sensor being installed in the center, then the maximum width of the circle-code on the disc can be calculated from the formula: Wcircle-code<Dd−W/2. As applied, W circle-code<0.04−0.052/2=0.014 m. If, as in the present example, the obtained value is extreme then it may be necessary to add 1 mm: Wcircle-code<0.013 m.

In one or more implementations, in order to estimate the maximum density of the circle-code 110, the circle-code 110 may comprise a continuous sequence of bits, coded by the principle of impulse ratio modulation. The width of 1 bit is calculated based on the maximum velocity of opening/closing of the phototransistor. For an industry-standard phototransistor, the velocity of rising/falling signal edge is about 7 microseconds (with the collector current of about 20 microampere). Accordingly, for correct-reading the width of the narrow bit T0 preferably does not exceed about 70 microseconds, which corresponds to 14 KHz. The width of the wide bit T1 can be twice as wide as of the narrow bit. Knowing the velocity of the disc and the width of the circle-code enables calculation of the complete (minimum) time of passing of the whole strip with the code under the sensor:

$$T = W_{\text{(circle-code)}}/V_{\max} = 0.013/6 = 0.0023 \text{ s}$$

Total Number of Bits:

$$N = T/T1 = 0.0023/0.00014 = 16$$

Number of combinations: $2^{16} = 65536$.

Figure 4D:
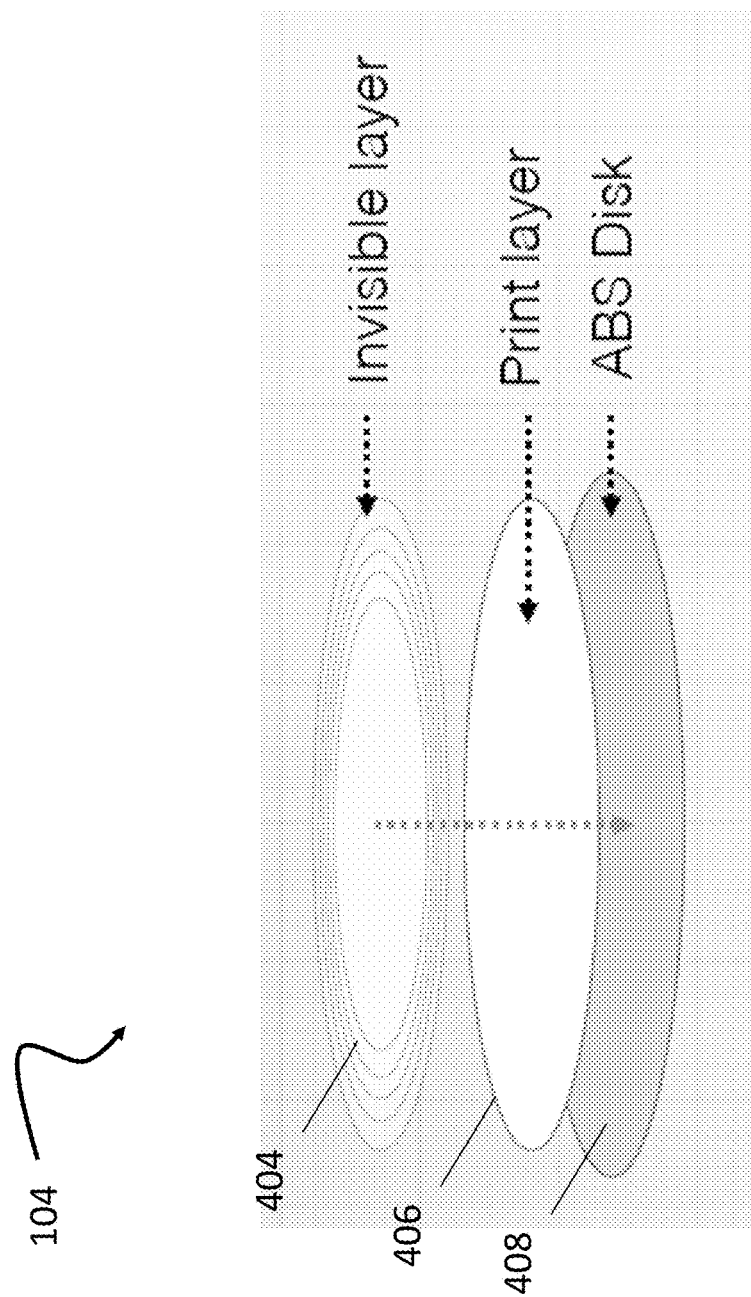

FIG. 4D is an exploded view of a disc 104 that illustrates placement of an invisible layer 404 over a print layer 406, which is placed on an ABS disc 408. For example, invisible layer 404 and/or print layer 406 can comprise infrared and/or ultraviolet technology to provide for code transmission that is not detectable by the human eye.

Figure 4E:
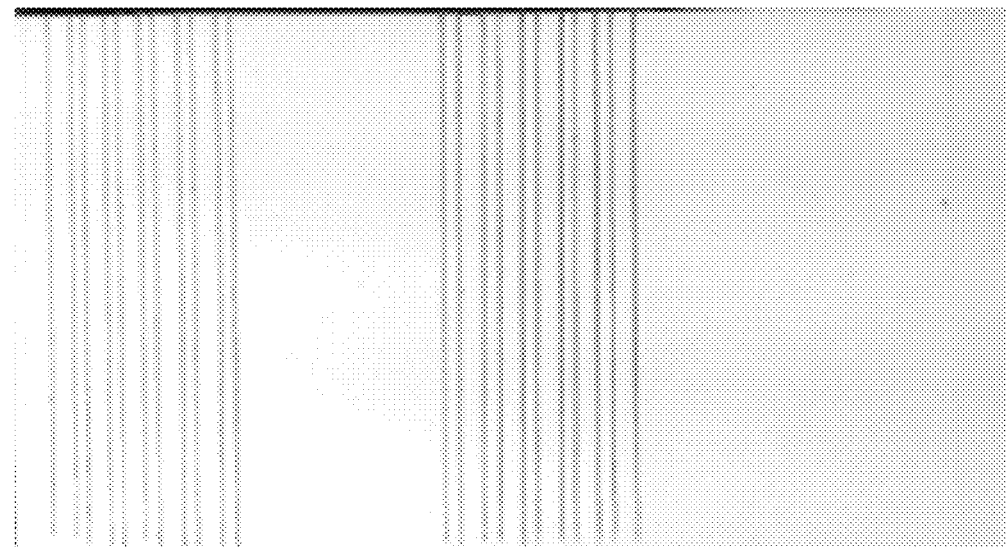

In one or more implementations, a circle code 110 is painted on disc 104 with polish that possesses high light-reflective capacity. Painting on the code 110 is in lieu of using a printed circle-code 110. In yet another alternative, a disc 104 is provided with physical grooves in lieu of a printed circle-code 110. An example of grooves etched into disc 104 is illustrated in FIG. 4E, in which circle-code 110 is grooved on to a plastic disc 104.

Figure 4F:
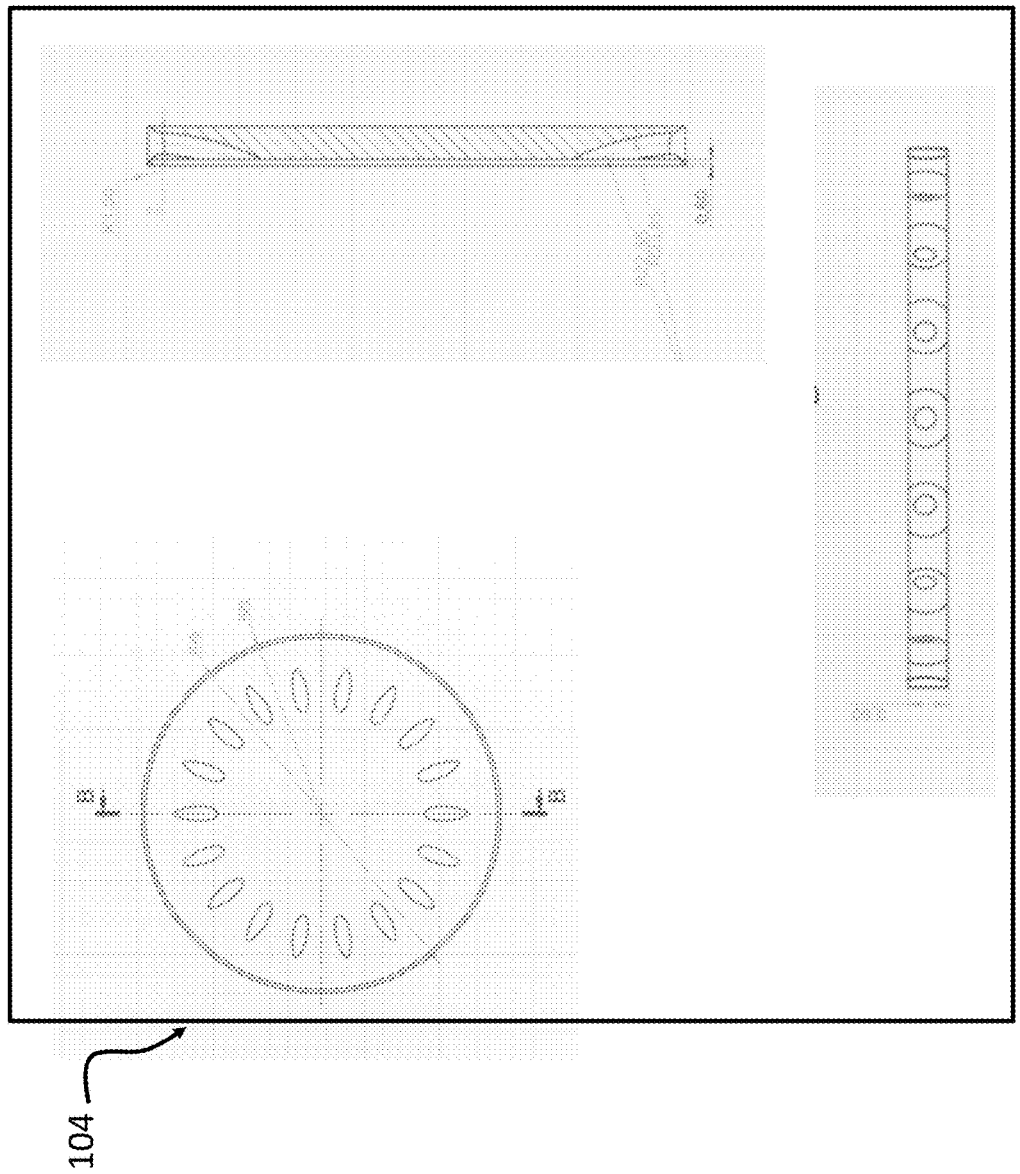

FIG. 4F illustrates views of an alternative design for a disc 104, which includes air channels and convex sides. The air channels in the disc 104 improve stability when the disc 104 is in motion, particularly at higher speeds (e.g., 4 to 5 m/s).

Figure 4G:
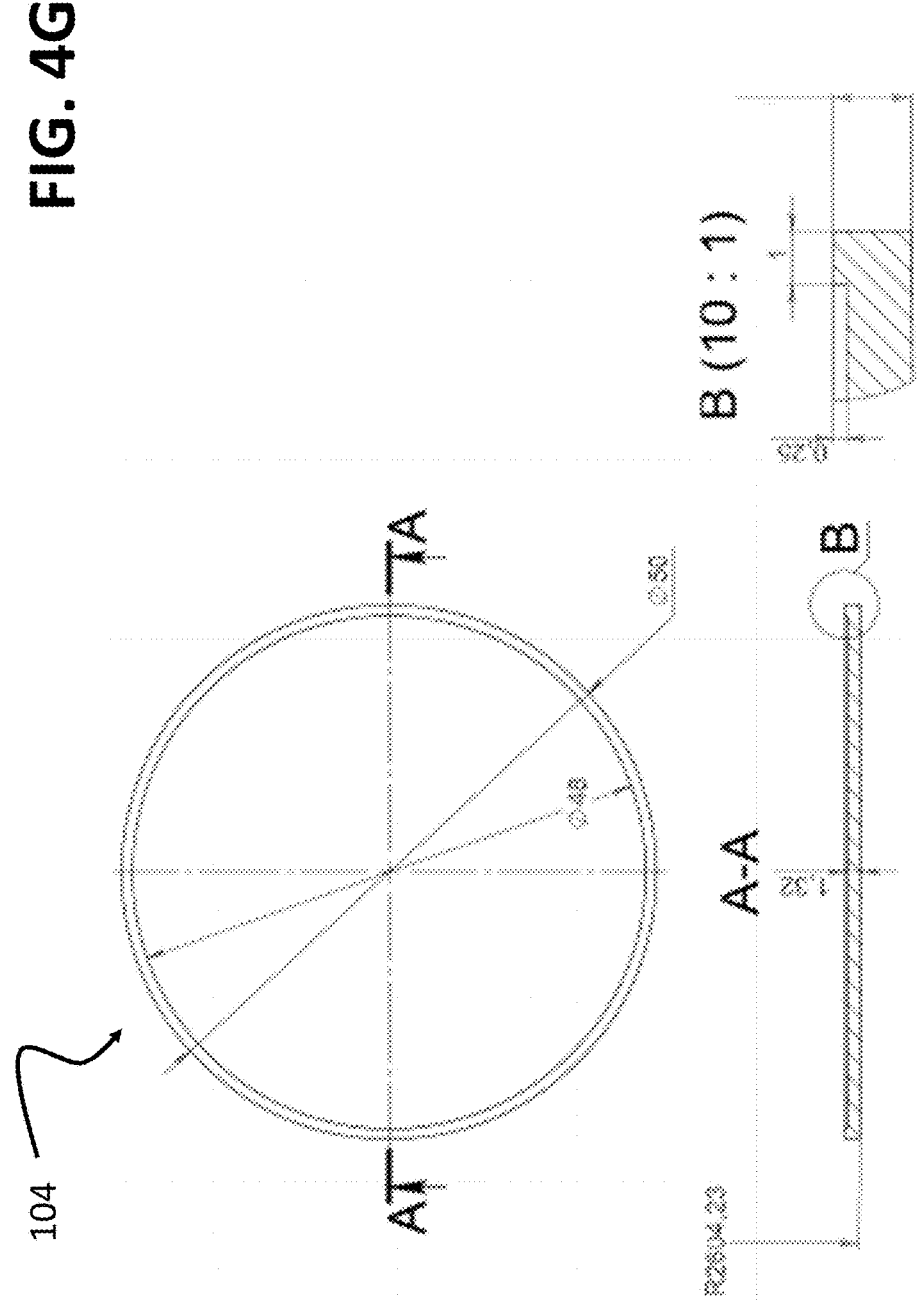

FIG. 4G illustrates an implementation of disc 104. This design is relatively simple for production and provides a stable hovering effect. The edge of the disc is thicker than the remainder of the disc 104 (e.g., 1.2 mm). This design prevents skin from getting cut. 2. Further by providing an edge that is firm, the disc 104 is less likely to break from frequent hits. In accordance with the respective disc 104 shown in FIG. 4G, the hovering speed is approximately $_{2.5-5}$ m/s, which results in hovering for more than: 5 m. Moreover, the example disc 104 shown in FIG. 4G has a diameter of approximately 50 mm, with a thickness of 1.2-1.32 mm and weighing approximately 2.6 g. The example disc 104 shown in FIG. 4G is made of ABS plastic. Other materials can be, for example, paper, cardboard, PVC plastic and PLA plastic.

Figure 4H:
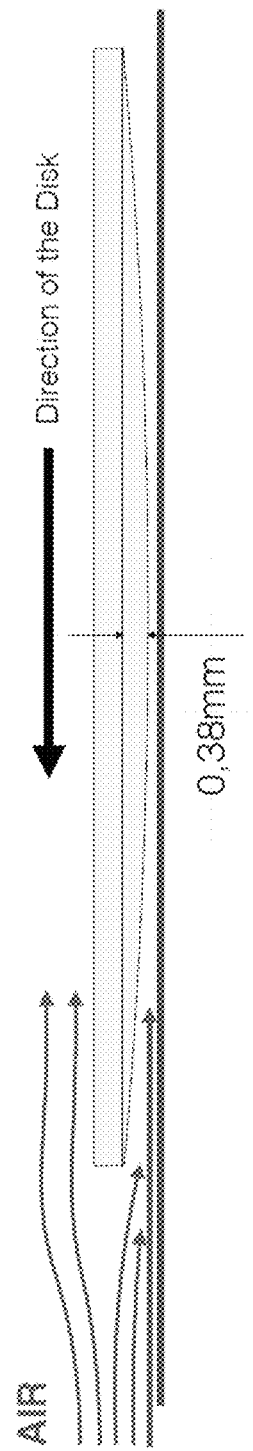

FIG. 4H illustrates an example disc 104 that is shaped with a convex edge that, among other features, provides for hovering as the disc 104 travels. As shown in FIG. 4H, air flows above the disc 104 and below disc 104, which provides for sufficient hovering. In accordance with one or more implementations, hovering is desirable, whereas flying should be avoided.

Figure 5A:
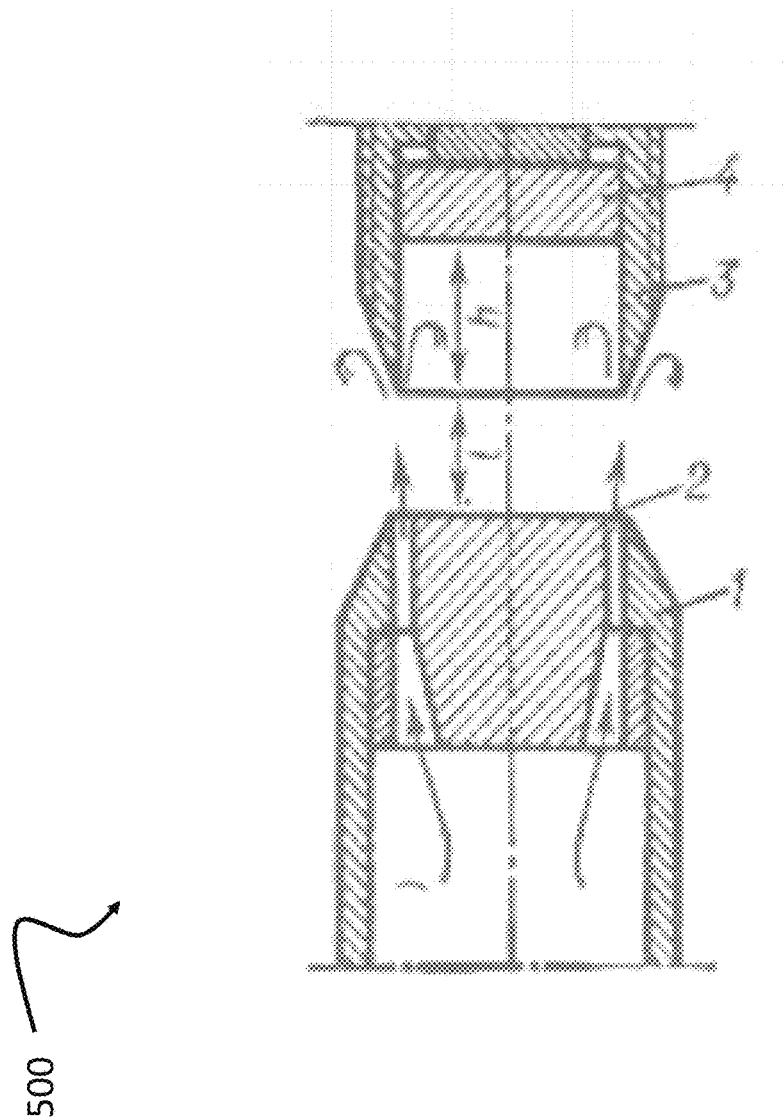
FIGS. 5A and 5B illustrate example implementations for providing audible functionality, in accordance with one or more implementations.

In one or more implementations, disc 104 is configured to provide an audible whistle sound as it moves. In one or more implementations, and as illustrated in FIG. 5A, a metal plate (a mouth harmonica tonguelet) can be placed inside or on the disc 104 and vibrates upon movement. Taking into account the size of the disc 104 (diameter is 50 mm, thickness is 3-5 mm), the effective length of the tonguelet is up to about 20-24 mm. Tonguelets can be placed symmetrically inside the disc, which accounts for the varying directions the disc 104 can travel in. The volume of the sound of the tonguelet can depend on the amplitude. The max value of the amplitude after the impact excitation increases with the increase of the length of the elastic element (the plate). For example, the tonguelet can be able to create the sound of 580 Hz and of 12 decibel with the max possible amplitude of oscillation. The maximum size of the element that hit the plate may be restricted by the size of the disc 104, such as 2.5 mm and 0.064 gr or less.

Figure 5B:
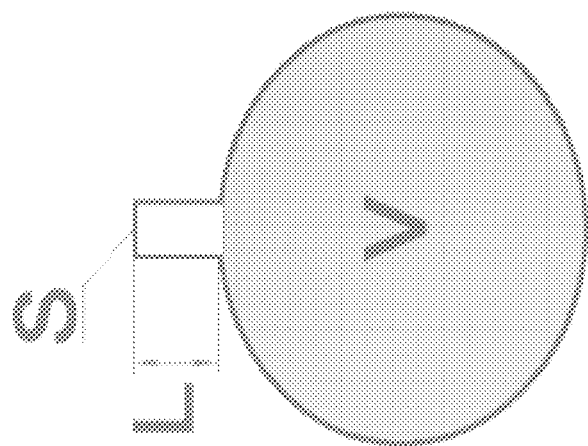

For the amplification of the sound, the bulk of the disc can be operable as a resonator. The maximum amplification of the sound takes place in the resonator, the length of which can equal a quarter of the sound wave to be amplified. $L = C/4f$, where C is the speed of the sound in the air, 340 m/s; f—oscillation frequency. For the oscillation frequency of 580 Hz (the frequency of oscillation of the used tonguelet) the size of the air column in the resonator can be 145 mm, which may be not possible for the disc 104. For example, to calculate the necessary frequency of oscillation, which can be amplified by the disc 104: $f = C/4$ L, L=48 mm, f=1.77 Hz. For the creation of this frequency the plate of the disc 104 can be 2 mm, which may produce a quiet sound. A resonance frequency calculation is shown in FIG. 5B.

Figure 6B:

In addition, disc 104 can be colored and/or decorated in various ways that can have meaning within the context of gameplay. FIG. 6A illustrates symbols provided on disc 104, and a plurality of sticker designs 602 and corresponding gameplay information is illustrated in FIG. 6B. In order to preserve text, design and colors on the stickers, for example, the convex design of the disc 104 and placement of the stickers 602 precludes scratching, such as by the surface of a table or other platform used during gameplay, as well as to make it more convenient to place the user's fingers on the disc 104.

Figure 7A:
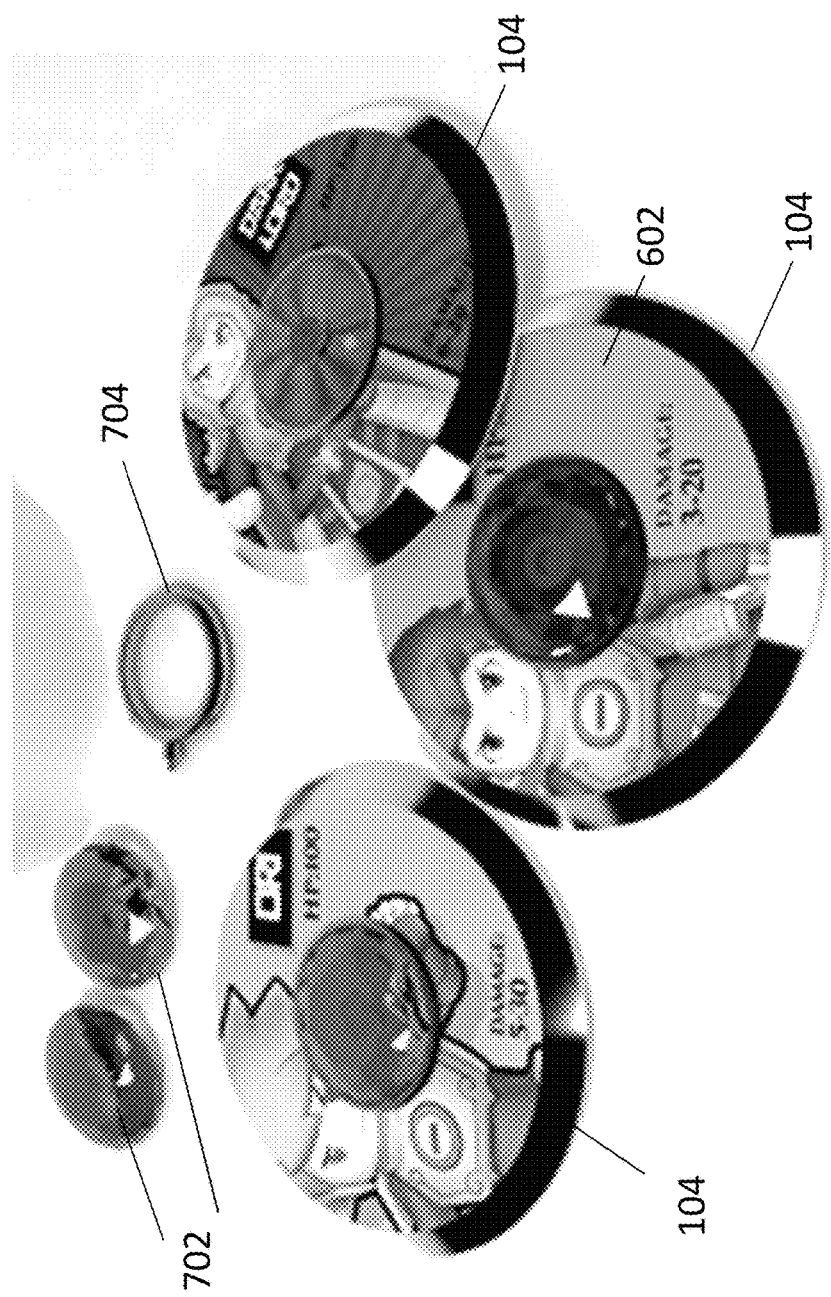

In one or more implementations, disc 104 can be configured to include various accessories, such as removable colored parts shaped as faceted and colored gems, as well as insertable rings for users to wear discs 104 on fingers. FIG. 7A illustrates a collection of discs 104 with stickers 602 placed thereon, and including play colored gem 702 and ring 704. Discs 104, stickers 602, gems 702 and/or rings 704 can be packaged and distributed for sale collectively or individually. Moreover, gem 702 can be configured with patterns, designs or other markings, such as in connection with gameplay.

Figure 7B:
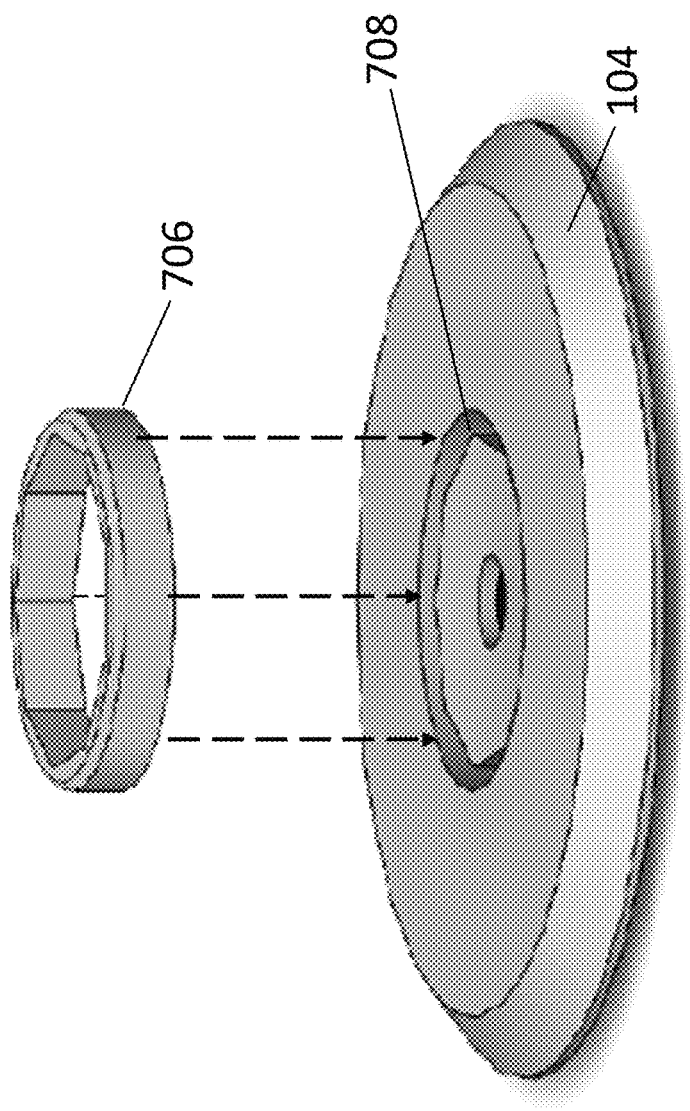
Figure 7D:
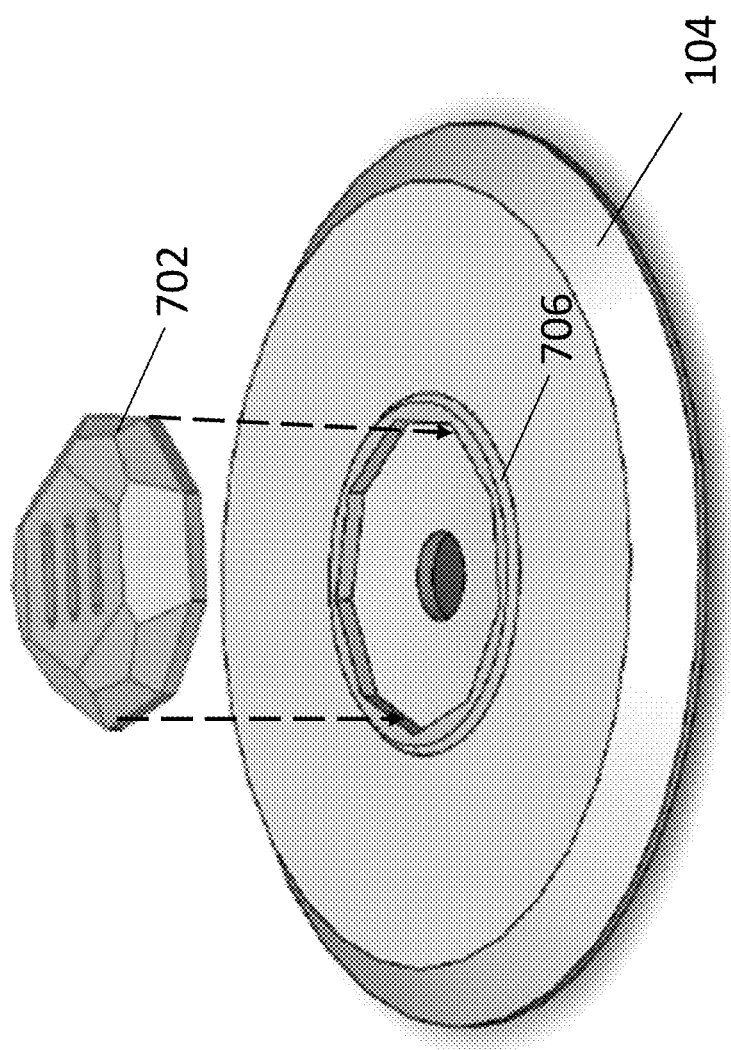

FIGS. 7B-7D illustrate views of disc 104, gem 702 and coupling member 706 in various states of assemblage. Gem 702 can be configured, for example, as an octagon and attachable to disc 104 with a coupling member 706. FIG. 7B is an exploded view showing the attachment of coupling member 706 to disc 104. Coupling member 706 can be glued or otherwise affixed within a recess 708 within disc 104. FIG. 7C illustrates coupling member 706 within disc 104. FIG. 7D is an exploded view illustrating gem 702 being inserted into coupling member 706 that is the recess 708 of disc 104.

Figure 7E:
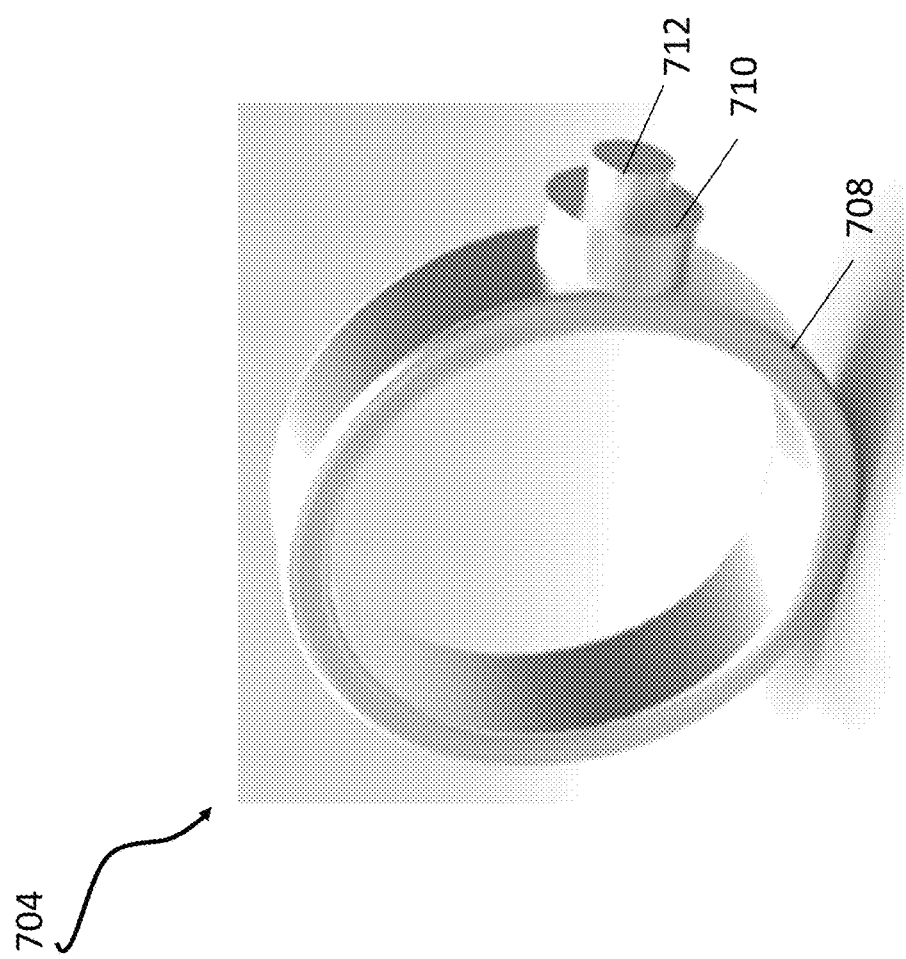
Figure 7F:
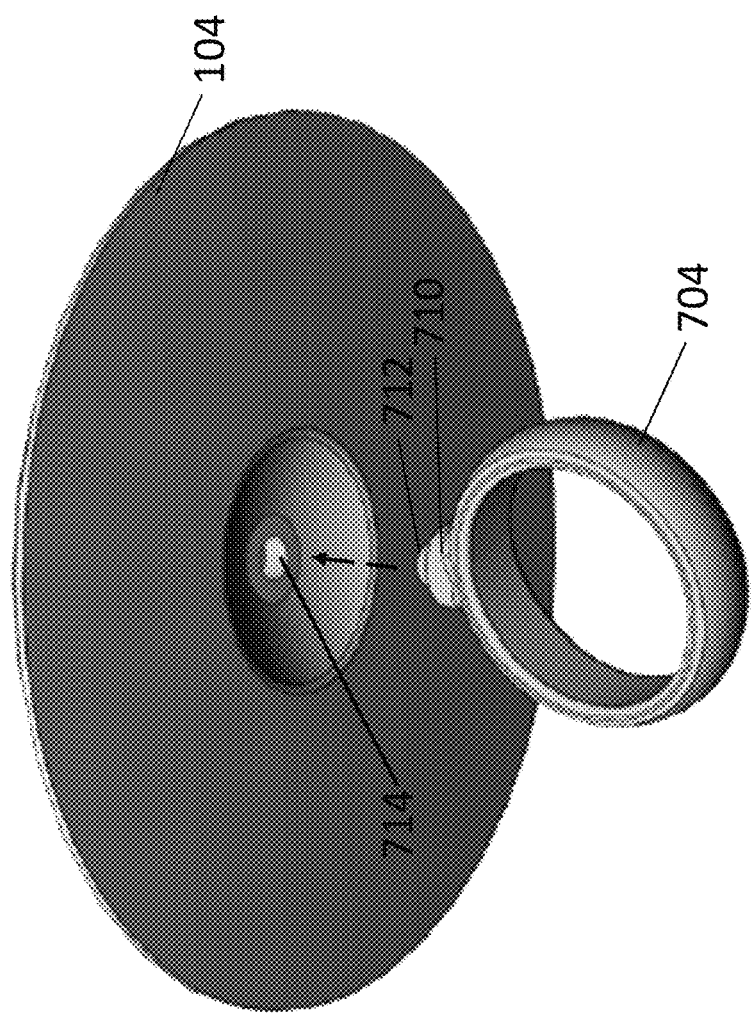
Figure 7G:
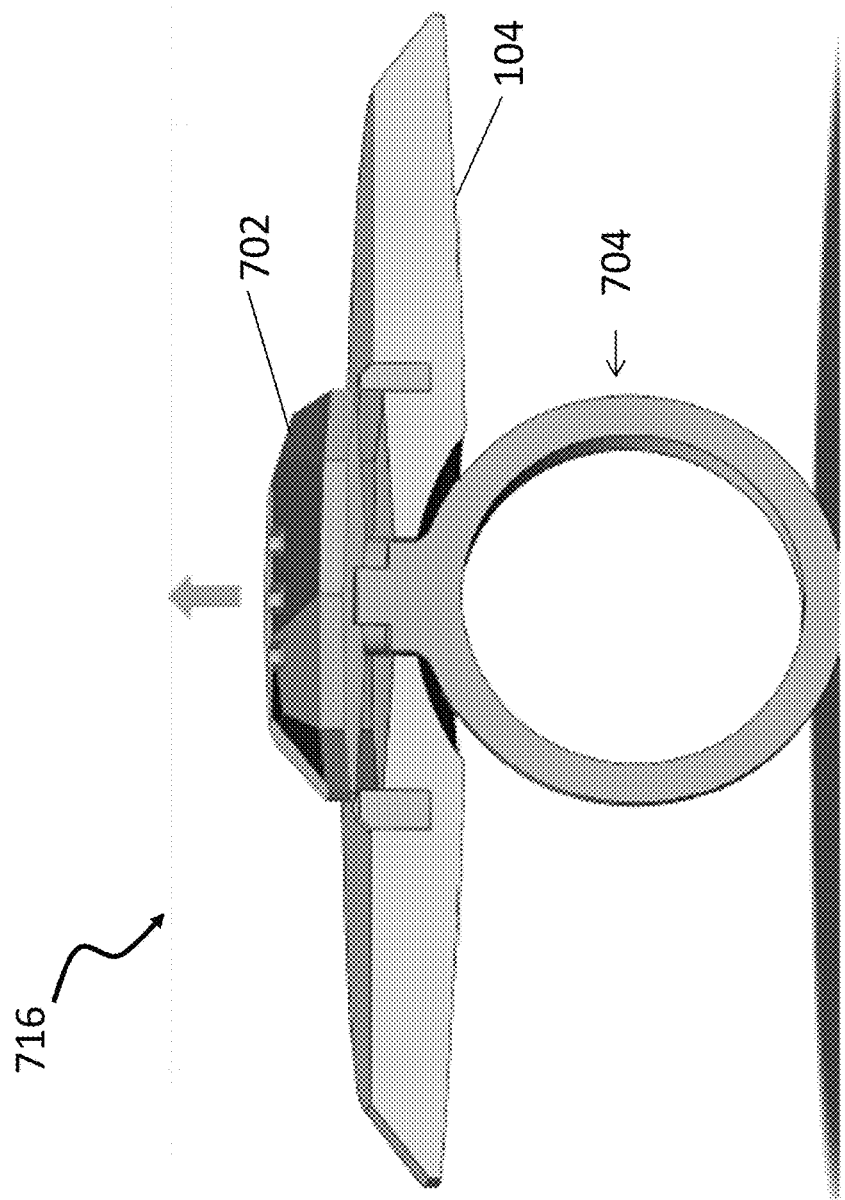
Figure 7H:
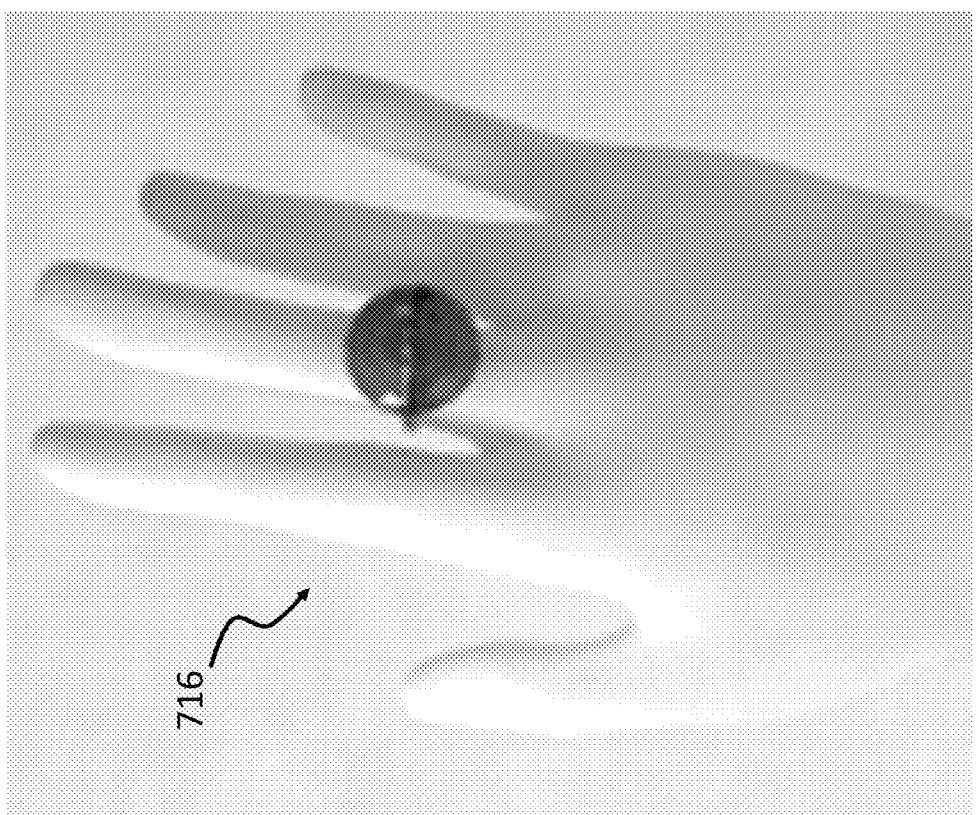
Figure 71:
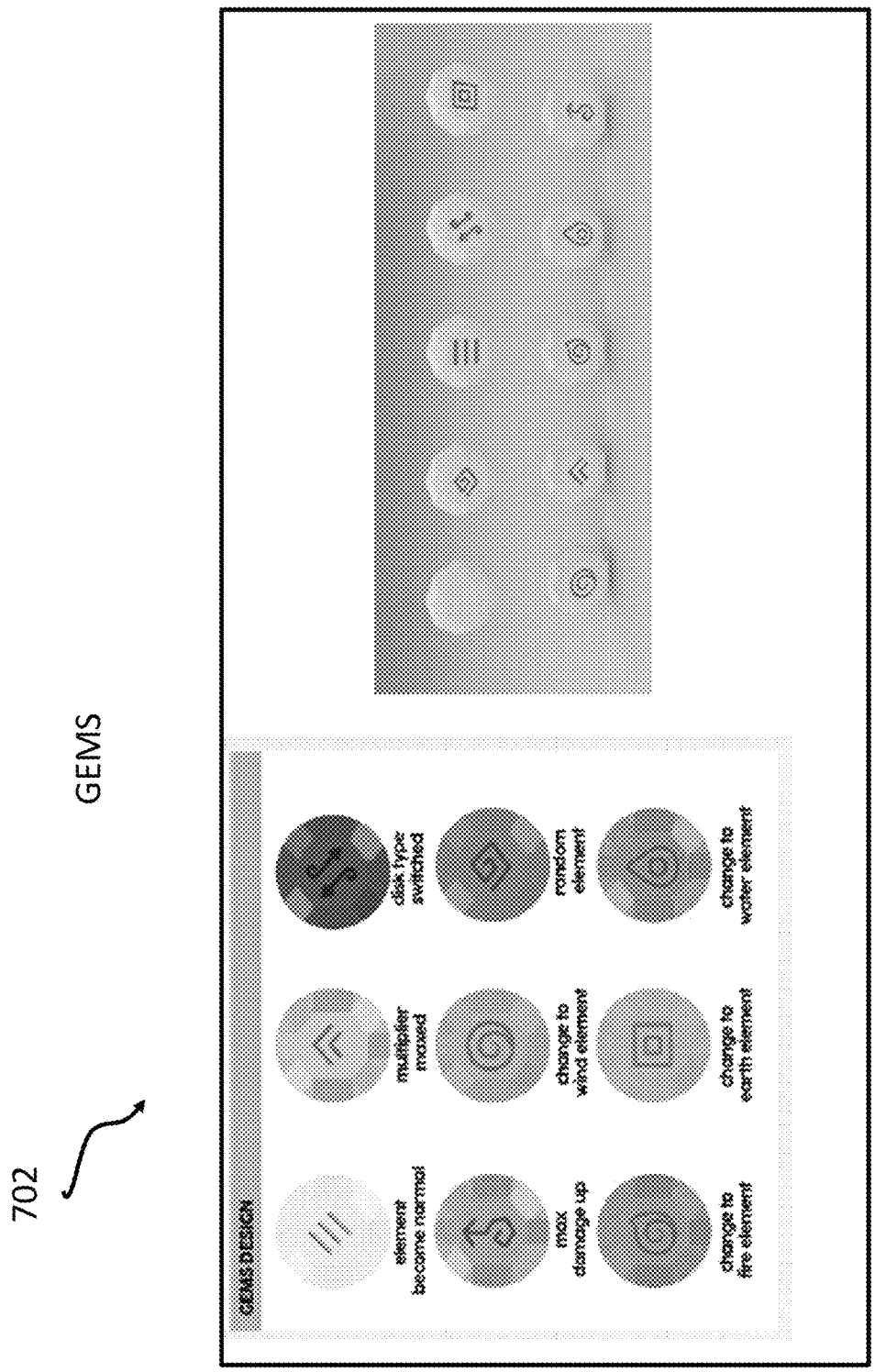

FIG. 7E illustrates an example ring 704 in accordance with one or more implementations of the present application. Ring 704 can include, for example, shank 708, head 710 and post 712 for coupling to disc 104. FIG. 7F is an exploded view of ring 704 coupled to disc 104. As shown in FIG. 7F, post 712 extends through aperture 714. FIG. 7G is a side view illustrating an assemblage 716 that includes disc 104, gem 702 and ring 704. FIG. 7H illustrates the assemblage 716 worn on a hand. Example gem designs, including embossed gems are illustrated in FIG. 7I.

Figure 8:
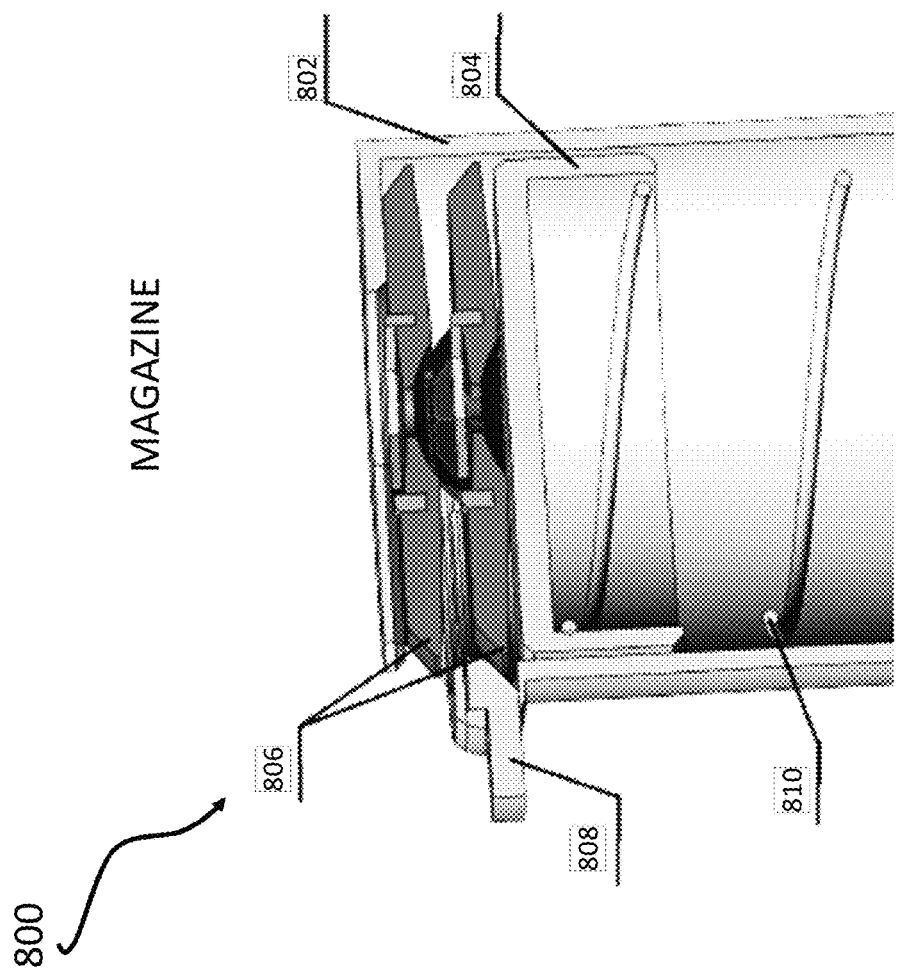
FIG. 8 illustrates an example disc magazine in accordance with an implementation of the present application.

FIG. 8 illustrates an example disc magazine 800 in accordance with an implementation of the present application. The magazine 800 includes the case 802, in the upper part of which there is a slit for extraction (or fill) of the discs 104. For even pressure of the spring 810 on the discs, the construction contains a feeder 804. The special shape of the discs 104 (e.g., a gem 702 on one side and a hollow on the other) may not provide reliable and stable extraction from the magazine 800 as the gem 702 goes into the hollow. This is resolved by spring-loaded wedge 808, which moves the previous disc 104 and releases the disc 104 from the force of the main spring 810. The discs 104 can be extracted with one hand while clasping the case with the palm, one presses the button of the wedge 808 with the pointing finger and push out the disc with the thumb.

FIGS. 9A-9I illustrate example gates 102 in accordance with one or more implementations of the present application.

Figure 9A:
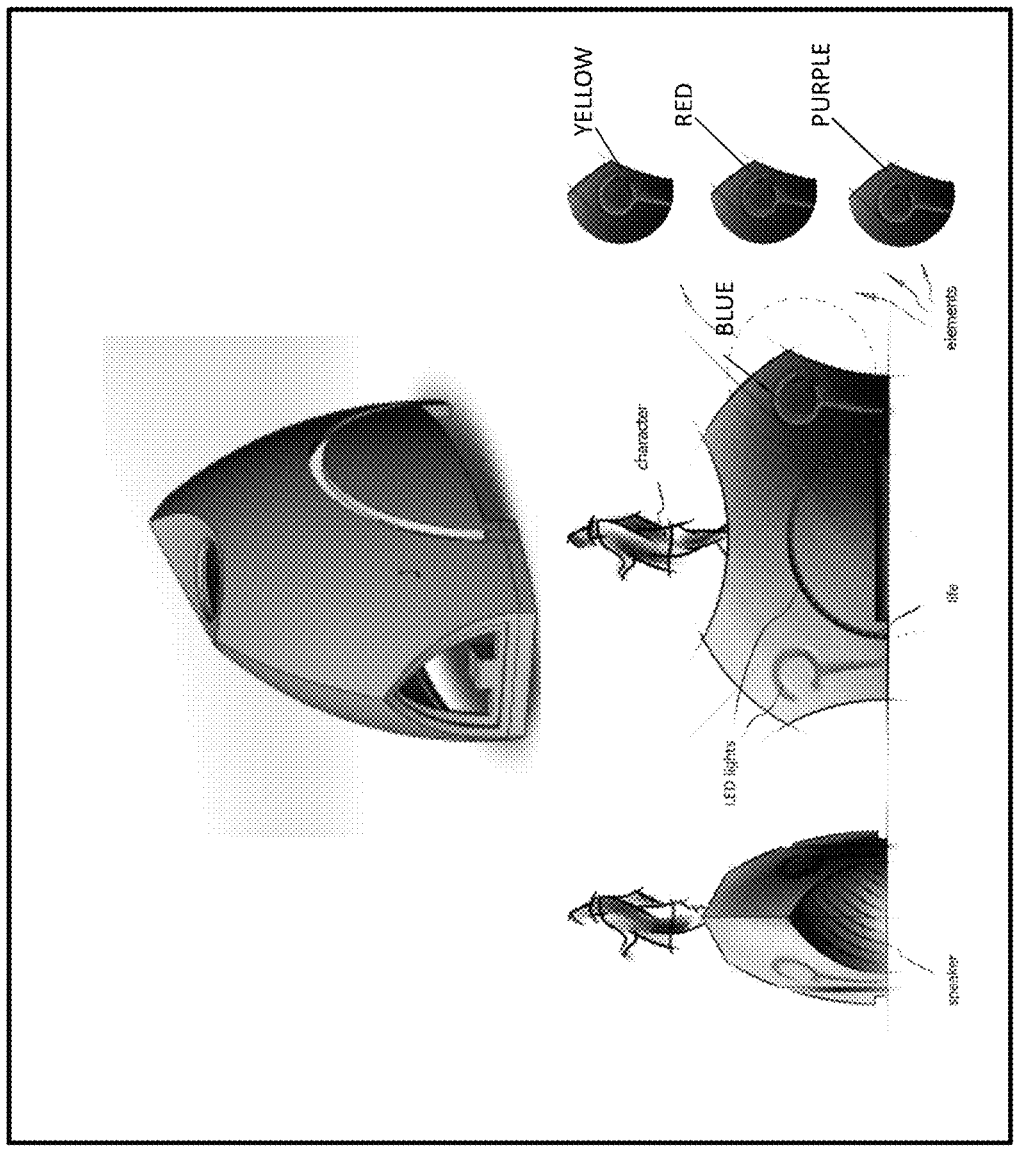
Figure 9B:
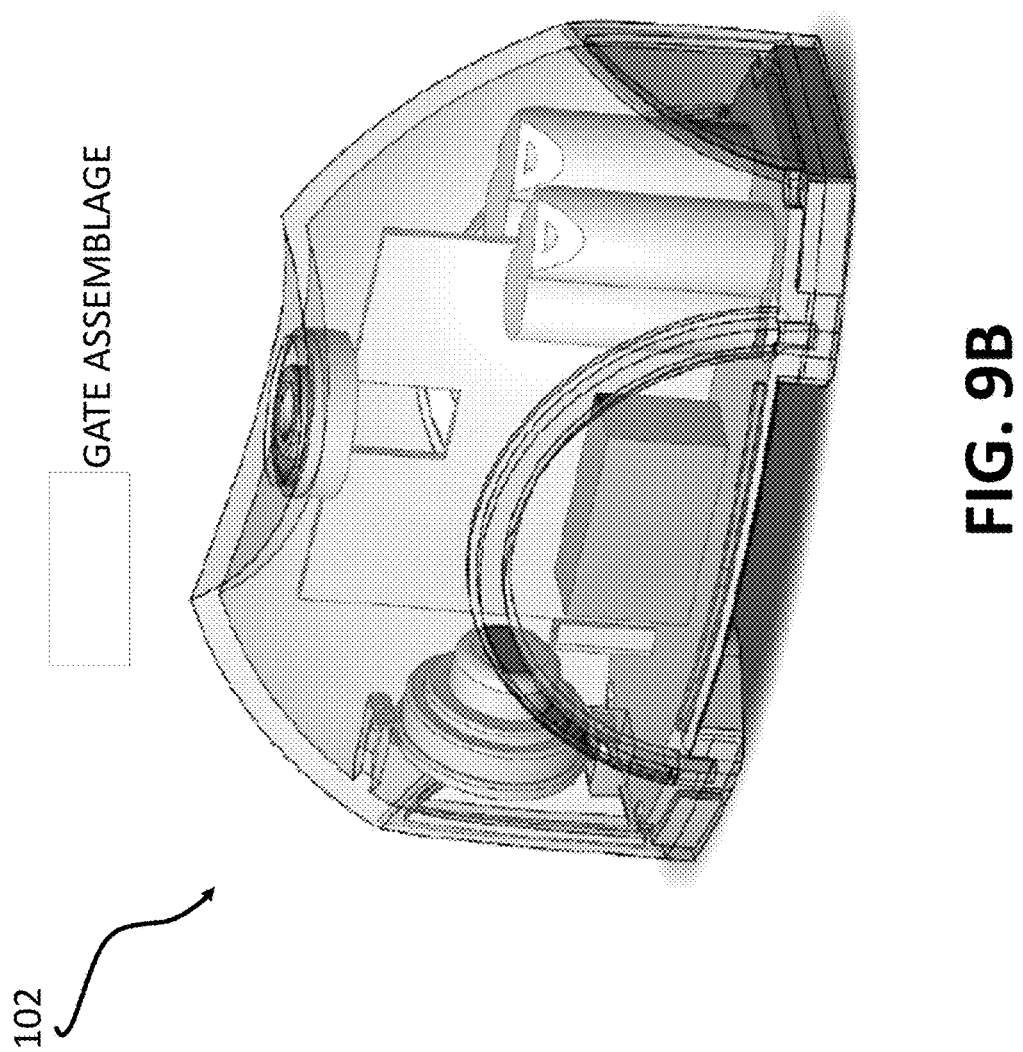
Figure 9C:
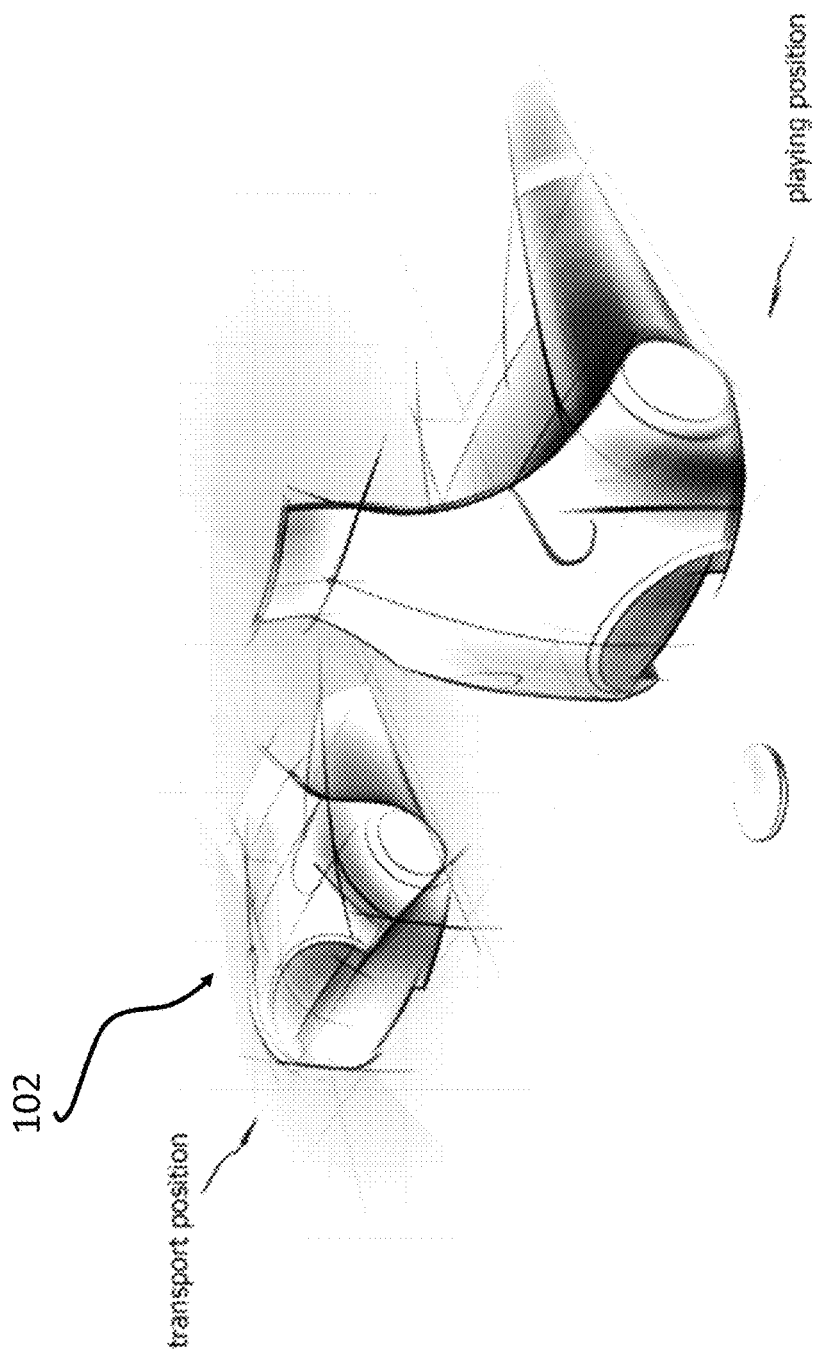
Figure 9D:
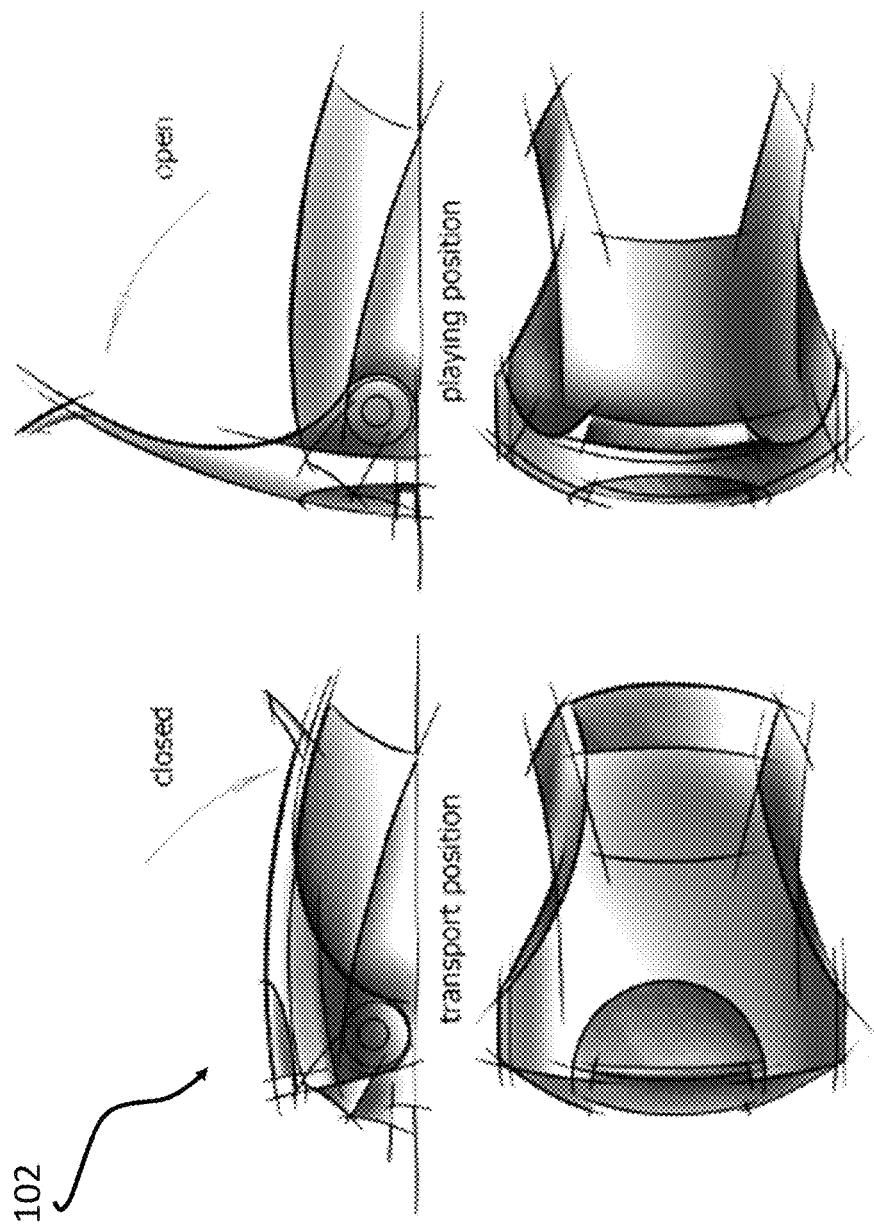
Figure 91:
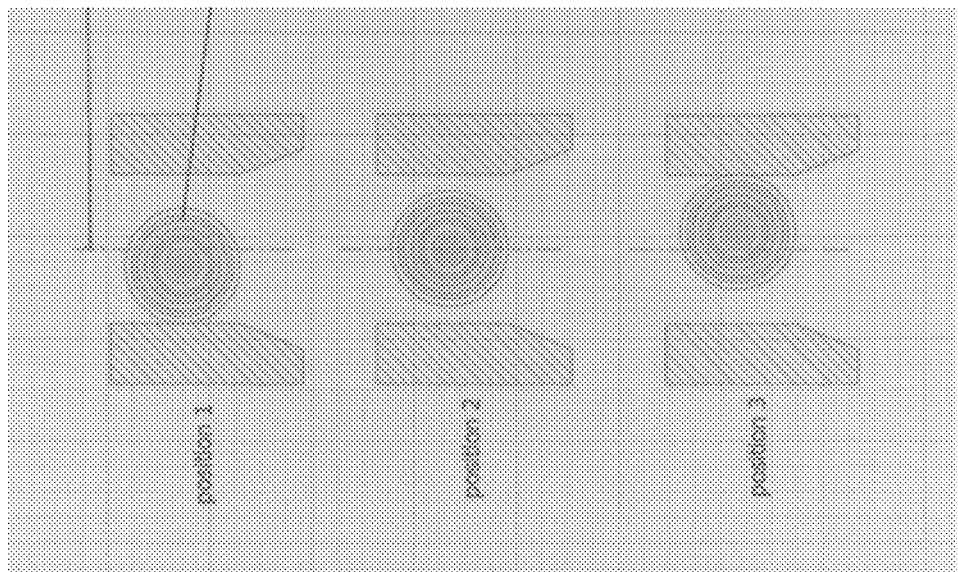

FIGS. 9A and 9B, for example, illustrates views and implementations of gate 102, including as configured with a figurine in the form of a character in context of gameplay. The application can further relate to one or more figurines that are incorporated or used in conjunction with one or more of the movable object optics and the gate apparatus. In the upper part of the gate 102, there is a counterpart into which the base of the connector can provide center positioning of a set of resistor contacts, which defines the type of object (e.g., a toy figurine) that is inserted. In addition, LEDs can be provided which illuminate the gate 102. The color used for the illumination can depend on the type of the figurine. These two elements are made of transparent plastic and serve as light guides. Unpainted parts of the base can be illuminated. The base can be closed by the lid and the toy (e.g., the figurine) can be mounted on the lid.

The implementations shown in FIGS. 9C-9H include example gates 102 configured in various ways and with respective functionality. For example, gate 102 can include a through-slot, LED or other kinds of display and a disc catcher.

FIG. 9I illustrates a gate 102 and a disc 104 traveling there-through in three instances, each at a different position between the gate 102. The present application provides for accurate reading of the code 110 at different positions, for example, as a function of one or more of the size of the disc 104, the width of the gate 102 and the code 110.

In one or more implementations, the present application relates to a specific game. The following relates to a specific and example implementation that includes a game.

Before the game starts the players can choose 3 characters. Each character possesses a specific power (e.g., earth, water, fire, air). The player puts one of the characters on top of the gate 102. The light of the corresponding color is lit symbolizing the power of that character. The semicircle of LED lights is also lit and shows the amount of lives the character has. Each character has different amount of lives.

The remaining discs 104 are put aside and can be used in certain cases during the game. During the game the discs 104 are taken from the top of the magazine one after another. The player cannot choose what disc to use at the moment. The players fling the discs 104 at turns. If the player hits the goal, he/she has the right to take another turn. If the player misses, the turn to fling the disc 104 goes to the opponent.

The player can choose to skip his/her turn and instead take any disc 104 from a pile of spare discs 104. The discs 104 that were flung at the player's gate 102 should be returned to their owner. The magazine 800 can be refilled only after the player has run out of all the discs 104 from it. Damage is calculated automatically by the system. To indicate the damage the LED lights change their color from blue to green to yellow to orange to red. Then the lights become dim and then turn off. After the first character of the player has run out of lives, the player can put the second one. And after the second character has run out of lives the player can put the third one. The game is over after 3 characters of one of the players have run out of lives.

The goal of the game is to drain all the energy from the opponent's army of (e.g., three) characters. To achieve this, the player should hit the gate 102 of the opponent. Each disc 104 takes away a certain amount of energy points (LED lights) from the opponent's gate 102. The game lasts until one of the players runs out of the energy points of his 3 characters. Depending on the type of the power used in the gate, on the type of the disc and on the speed of the disc that hit the gate the damage is calculated.

A player puts the discs 104 into the magazine in the order he/she pleases. During the game the discs are taken from the top of the magazine one after another. The player cannot choose what disc to use at the moment. The players fling the discs at turns. If the player hits the goal, he/she has the right to take another turn. If the player missed, the turn to fling the disc goes to the opponent.

The discs 104 that were flung at the player's gate 102 should be returned to their owner. After the first character of the player has run out of lives, the player can put the second one. And after the second character has run out of lives the player can put the third one. The game is over after 3 characters of one of the players have run out of lives.

The remaining discs 104 are put aside and can be used in certain cases during the game. During the game, the discs 104 are taken from the top of the magazine 800 one after another. In such case, the player cannot choose what disc 104 to use at the moment. The players fling the discs 104 at turns. If the player hits the goal, he/she has the right to take another turn. If the player missed, the turn to fling the disc goes to the opponent.

The discs are divided into 4 types: Water; Fire; Earth; Air. The same powers and powers in other cases are equal. The water power beats fire with +50% force. The fire power beats earth with +50% force. The earth power beats air with +50% force. The wind power beats water with +50% force. The same powers and powers in other cases are equal. Fire and Wind discs do more damage if they are flung at high speed. Earth and Water discs do more damage when they are flung at low speed. With regard to damage, nominal damage is: 10, 20, 30, 40, 50, 60, 70, 80, 90, 100. Factual damage depends on the disc type, speed and the character's defense.

There are various (e.g., 9) types of gems that can be inserted into the disc 104 to change the disc's type and force. For example: Fire gem: changes disc element to fire. Water gem: changes disc element to water. Wind gem: changes disc element to wind. Earth gem: changes disc element to earth. Random element gem: changes disc element to random element, the gate will register it as one of element. Normal gem: changes disc element to normal/non elemental. Disc properties swap gem: swap disc properties/special effect in example: the disc with slow slide=max damage become fast slide=max damage.

Multiplier maxed gem: the damage always maxed out no matter what disc 104 properties is and no matter how fast/slow player slides the disc 104. Max damage maxed gem: monster disc gain more attack power, maybe +20, but the damage still calculated depend on how fast/slow player slide the disc.

For every power the discs 104 can be divided into 4 types: Smashing; Knocking off; Super hit; Hit of the Gods. Also the discs 104 can be divided into the levels of the magic. The "Smashing" and the "Knocking off" can be only of the 1st and 2nd levels. The "Super hit" and the "Hit of Gods" can be only of 2nd, 3rd and 4th levels. The water power beats fire with double force. The fire power beats earth with double force. The earth power beats air with double force. The air power beats water with double force. The greater the speed of the "Smashing" and the "Super hit" discs the harder they hit. The lower the speed of the "Knocking off" and the "Hit of the Gods" discs the harder they hit. The higher the level of the magic, the greater the force of the hit.

Four characters can be included: On (Wind power); Dark Prince (Fire power); Nivi (Earth power); Dark Lord (Fire power). The characters possess a certain amount of life points that will be represented by the LED lights on the gates. blue-green-yellow-orange-red. For the character who has the greatest amount of lives the life indicator will start with the blue color. Then as the character loses lives they will turn into green, then yellow, then orange and then red. For other characters who have less life points life indicator can start with green, yellow or orange colors. The system will automatically detect what power this character represents and how many life points the character has.

With regard to game tactic, the player can place the discs in the magazine in an order (s)he feels is most effective. The player chooses the initial power of his/her gate 102 by placing a corresponding figurine (character). Then the players choose who will start the game by mutual agreement or in any other way. The player takes out the top disc 104 from the magazine 800. If the player took out the "Smashing" or the "Super hit" disc, then he/she tries not only to hit the gates 102, but also to set the maximum speed to bring most damage. If the player took out the "Knocking off" or the "Hit of the Gods" disc then he/she tries to set minimum speed while trying to hit the gates 102 to bring most damage.

Various (e.g., 4) types of sound (short phrases) can be recorded and played at various times, such as when the power button is turned on; where there is a successful shot; when there is a max shot; and when the character has run out of lives. Specific rules and values are shown in FIGS. 10A and 10B.

Although the gameplay described herein regards a specific implementation, variations of the game are envisioned without departing from the spirit herein.

An exemplary computer system is shown as a block diagram in FIG. 11 which is a high-level diagram illustrating an exemplary configuration of a system 1100. Computing device 1105 can be a personal computer or server, or can be a mobile computing device, such as a tablet computer, a laptop computer, a smartphone or other suitable computing device. Thus, it is to be understood that computing device 1105 of system 1100 can be practically any computing device and/or data processing apparatus capable of embodying the systems and/or methods described herein.

Computing device 1105 of system 1100 can include a circuit board 1140, such as a motherboard, which is operatively connected to various hardware and software components that serve to enable operation of the system 1100. The circuit board 1140 can be operatively connected to a processor 1110 and a memory 220. Processor 1110 serves to execute instructions for software that can be loaded into memory 1120. Processor 1110 can be a number of processors, a multi-processor core, or some other type of processor, depending on the particular implementation. Further, processor 1110 can be implemented using a number of heterogeneous processor systems in which a main processor is present with secondary processors on a single chip. As another illustrative example, processor 1110 can be a symmetric multi-processor system containing multiple processors of the same type.

Preferably, memory 1120 and/or storage 1190 are accessible by processor 1110, thereby enabling processor 1110 to receive and execute instructions stored on memory 1120 and/or on storage 1190. Memory 1120 can be, for example, a random access memory (RAM) or any other suitable volatile or non-volatile computer readable storage medium. In addition, memory 1120 can be fixed or removable. Storage 1190 can take various forms, depending on the particular implementation. For example, storage 1190 can contain one or more components or devices such as a hard drive, a flash memory, a rewritable optical disc, a rewritable magnetic tape, or some combination of the above. Storage 1190 also can be fixed or removable.

One or more software modules 1130 are encoded in storage 1190 and/or in memory 1120. The software modules 1130 can comprise one or more software programs or applications having computer program code or a set of instructions executed in processor 1110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 1105, partly on computing device 1105, as a stand-alone software package, partly on computing device 1105 and partly on a remote computer/device, or entirely on the remote computer/device or server. In the latter scenario, the remote computer can be connected to computing device 1105 through any type of network, including a local area network (LAN) or a wide area network (WAN), or the connection can be made to an external computer (for example, through the Internet 1160 using an Internet Service Provider).

One or more software modules 1130, including program code/instructions, are located in a functional form on one or more computer readable storage devices (such as memory 1120 and/or storage 1190) that can be selectively removable. The software modules 1130 can be loaded onto or transferred to computing device 1105 for execution by processor 1110. It can also be said that the program code of software modules 1130 and one or more computer readable storage devices (such as memory 1120 and/or storage 1190) form a computer program product that can be manufactured and/or distributed in accordance with the present invention, as is known to those of ordinary skill in the art.

It is to be understood that, in some illustrative embodiments, one or more of software modules 1130 can be downloaded over a network to storage 1190 from another device or system via communication interface 1150 for use within system 1100. For instance, program code stored in a computer readable storage device in a server can be downloaded over a network from the server to system 1100.

Moreover, the software modules 1130 can include a code processing application 1170 that is executed by processor 1110. During execution of the software modules 1130, and specifically the code processing application 1170, the processor 1110 configures the circuit board 1140 to perform various operations relating to code processing with computing device 1105, as will be described in greater detail below.

Furthermore, it is to be understood that while software modules 1130 and/or code processing application 1170 can be embodied in any number of computer executable formats, in certain implementations software modules 1130 and/or code processing application 1170 comprise one or more applications that are configured to be executed at computing device 1105 in conjunction with one or more applications or 'apps' executing at remote devices, such as computing device(s) 1115, 1125, and/or 1135 and/or one or more viewers such as internet browsers and/or proprietary applications. Furthermore, in certain implementations, software modules 1130 and/or code processing application 1170 can be configured to execute at the request or selection of a user of one of computing devices 1115, 1125, and/or 1135 (or any other such user having the ability to execute a program in relation to computing device 1105, such as a network administrator), while in other implementations computing device 1105 can be configured to automatically execute software modules 1130 and/or code processing application 1170, without requiring an affirmative request to execute. It should also be noted that while FIG. 11 depicts memory 1120 oriented on circuit board 1140, in an alternate arrangement, memory 1120 can be operatively connected to the circuit board 1140. In addition, it should be noted that other information and/or data relevant to the operation of the present systems and methods (such as database 1180) can also be stored on storage 1190, as will be discussed in greater detail below.

Continuing with reference to FIG. 11, storage 1190 can store database 1180. As described in greater detail below, database 1180 can contain and/or maintain various data items and elements that are utilized throughout the various operations of system 1100. Although database 1180 is depicted in FIG. 11 as being configured locally to computing device 1105, in certain implementations database 1180 and/or various of the data elements stored therein can be located remotely (such as on a remote device or server—not shown) and connected to computing device 1105 through network 1160, in a manner known to those of ordinary skill in the art.

As referenced above, it should be noted that in certain implementations, such as the one depicted in FIG. 11, various ones of the computing devices 1115, 1125, 1135 can be in periodic or ongoing communication with computing device 1105 through a computer network, such as the Internet 1160. Moreover and in certain other implementations, computing devices 1115, 1125, and/or 1135 can be in periodic or ongoing direct communication with computing device 1105, such as through communications interface 1150, such as during an interactive multiplayer game (not shown).

Continuing with reference to FIG. 11, communication interface 1150 is illustrated as also operatively connected to circuit board 1140. Communication interface 1150 can be any interface that enables communication between the computing device 1105 and external devices, machines and/or elements. Preferably, communication interface 1150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 1105 to other computing devices and/or communication networks such as private networks and the Internet. Such connections can include a wired connection or a wireless connection (e.g. using the 802.11 standard) though it should be understood that communication interface 1150 can be practically any interface that enables communication to/from the circuit board 1140.

At various points during the operation of system 1100, computing device 1105 can communicate with one or more computing devices, for example, those controlled and/or maintained by one or more individuals and/or entities, such as user devices 1115, 1125, and/or 1135, such as during a multiplayer game. Such computing devices can transmit and/or receive data to/from computing device 1105, thereby initiating maintaining, and/or enhancing the operation of the system 1100. The computing devices 1115-1135 can be in direct communication with computing device 1105, indirect communication with computing device 1105, and/or can be communicatively coordinated with computing device 1105. While such computing devices can be practically any device capable of communication with computing device 1105, in certain embodiments various of the computing devices are servers, while other computing devices are user devices (e.g., personal computers, handheld/portable computers, smartphones, etc.) and, thus, that practically any computing device that is capable of transmitting and/or receiving data to/from computing device 1105 can be suitable.

Moreover, while FIG. 11 depicts system 1100 with respect to computing devices 1115, 1125, and 1135, virtually any number of computing devices can interact with the system 1100 in a manner described herein. It should be further understood that a substantial number of operations shown and described herein can be initiated by and/or performed in relation to such computing devices. For example, as referenced above, such computing devices can execute applications and/or viewers that request and/or receive data from computing device 1105, substantially in the manner described in detail herein.

The present application includes certain embodiments and/or arrangements reference to acts and symbolic representations of operations that are performed by one or more devices, such as shown and described in the system 1100 of FIG. 11. Such acts and operations, which are at times referred to as being computer-executed or computer-implemented, can include manipulation by the processor 1110 of electrical signals representing data in a structured form. This manipulation transforms the data and/or maintains them at locations in the memory system of the computer (such as memory 1120 and/or storage 1190), which can reconfigure and/or otherwise alter the operation of the system in a manner understood by those skilled in the art. The data structures in which data are maintained can be physical locations of the memory that have particular properties defined by the format of the data. Of course, one skilled in the art will recognize that this not meant to provide architectural limitations to the manner in which different embodiments can be implemented. The different illustrative embodiments can be implemented in a system including components in addition to or in place of those illustrated for the system 1100. Other components shown in FIG. 11 can be varied from the illustrative examples shown. The different embodiments can be implemented using any suitable hardware device or system capable of running program code. In another illustrative example, system 1100 can take the form of a hardware unit that has circuits that are manufactured or configured for a particular use. This type of hardware can perform operations without requiring program code to be loaded into a memory from a computer readable storage device to be configured to perform the operations.

For example, computing device 1105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 1130 can be omitted because the processes for the different embodiments are implemented in a hardware unit.

In still another illustrative example, computing device 1105 can be implemented using a combination of processors found in computers and hardware units. Processor 1110 can have a number of hardware units and a number of processors that are configured to execute software modules 1130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 1150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types. While the various computing devices and machines referenced herein, including but not limited to computing device 1105, computing devices 1115, 1125, and 1135, are referred to herein as individual/single devices and/or machines, in certain implementations the referenced devices and machines and their associated and/or accompanying operations, features, and/or functionalities can be arranged or otherwise employed across any number of devices and/or machines, such as over a network connection.

Furthermore and although not all illustrated in FIG. 11, various additional components can be incorporated within and/or employed in conjunction with computing device 1105. For example, computing device 1105 can include an embedded and/or peripheral image capture device such as a camera 1145 and/or an embedded and/or peripheral audio capture device such as a microphone.

Figure 12:
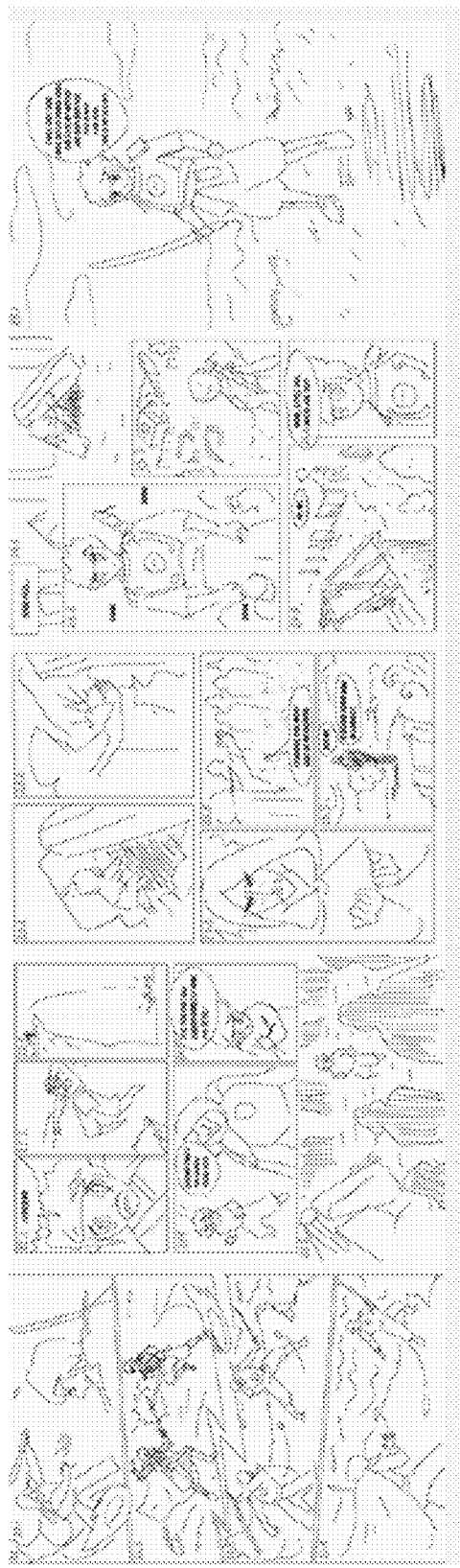
FIG. 12 illustrates a storyboard in connection with a comic book that implements features of the present application.

In addition to games, the present application can be configured in connection with stories, movies or other fiction. FIG. 12 illustrates a storyboard in connection with a comic book that implements features of the present application.

Turning now to FIG. 13, a flow diagram is described showing a routine 1300 that illustrates a broad aspect of a method for processing code(s) in accordance with at least one embodiment disclosed herein. Several of the logical operations described herein are implemented (1) as a sequence of computer implemented acts or program modules running on computing device and/or (2) as interconnected machine logic circuits or circuit modules within one or more computing devices. The implementation is a matter of choice dependent on the requirements of the device (e.g., size, energy, consumption, performance, etc.). Accordingly, the logical operations described herein are referred to variously as operations, steps, structural devices, acts, or modules. Various of these operations, steps, structural devices, acts and modules can be implemented in software, in firmware, in special purpose digital logic, and any combination thereof. Furthermore, more or fewer operations can be performed than shown in the figures and described herein. These operations can also be performed in a different order than those described herein.

Continuing with reference to FIG. 13, as noted herein and in at least one implementation, at least one light source is configured to provide light and at least one light sensor is configured to detect light respectively provided by the at least one light source, wherein the light reflects from a machine readable code supported by a surface of a moving object. At least one processor is configured as a function of executing instructions in non-transitory processor readable media, and a display is configured to display information from the at least one processor. Light from the at least one light source reflects from at least a first portion of the machine readable code as the object moves, and is detected by the at least one light sensor (step 1302). The at least one processor determines information representing the moving object (step 1304). The at least one processor further determines a first time when the at least one sensor detects the light reflecting from the first portion of the machine readable code (step 1306). Light from the at least one light source reflects from at least a second portion of the machine readable code as the object moves, and is detected by the at least one light sensor (step 1308). The at least one processor further determines a second time when the at least one sensor detects the light reflecting from the second portion of the machine readable code (step 1310). The at least one processor further determines the speed of moving object as a function of information, first time and second time (step 1312). The speed of the moving object is displayed (step 1314). Thereafter, the process ends (not shown).

Although illustrated embodiments of the present invention have been shown and described, it should be understood that various changes, substitutions, and alterations can be made by one of ordinary skill in the art without departing from the scope of the present invention.

What is claimed is:

1. A code detecting system associated with laterally moving objects, the system comprising:
   at least one light source that is configured to provide light;
   a light sensor that is configured to detect light respectively provided by the at least one light source, wherein the light provided by the at least one light source reflects from a machine readable code supported by a surface of a laterally moving object;
   at least one processor that is configured as a function of executing instructions in non-transitory processor readable media; and
   a display configured to display information from the at least one processor,
   wherein light from the at least one light source reflects from at least a first portion of the machine readable code as the object moves laterally, and is detected by the light sensor,
   further wherein light from the at least one light source reflects from at least a second portion of the machine readable code as the object moves laterally, and is detected by the light sensor, and
   further wherein the at least one processor is configured to:
      determine, as a function of the machine readable code, information representing the moving object;
      identify a first time when the sensor detects the light reflecting from the first portion of the machine readable code;
      identify a second time when the sensor detects the light reflecting from the second portion of the machine readable code; and determine a speed of the laterally moving object, as a function of the information representing the object, the first time and the second time, further wherein, information representing at least the speed of the object is generated by the at least one processor and displayed by the display.

2. The system of claim 1, wherein the laterally moving object is configured as a disc and the machine readable code is formatted as concentric rings having respective variable width, and further wherein the first portion of the machine readable code is provided at one end of the disc and the second portion of the machine readable code is provided at the other end of the disc.

3. The system of claim 2, wherein a width of one respective ring corresponds to a value, and a different width of another respective ring corresponds to a different value.

4. The system of claim 3, wherein the values equal 0 and 1, respectively.

5. The system of claim 1, wherein the information representing the laterally moving object includes the size of the object.

6. The system of claim 1, further wherein:
the sensor is configured to detect reflected light having a particular color;
the laterally moving object is configured with a colored translucent component;
the sensor detects the color of the light reflecting from the machine readable code; and
the at least one processor determines additional information of the laterally moving object, as a function of the color of the light and the information representing the moving object.

7. The system of claim 1, further comprising:
a communication module that is configured to communicate information from the at least one processor over a network to at least one computing device.

8. The system of claim 1, further comprising a gate that is configured to include the at least one light source and the light sensor, wherein the laterally moving object passes through the gate.

9. The system of claim 1, wherein the light sensor comprises two respective light sensors, and wherein the first portion of the machine readable code is detected by a first of the two light sensors and the second portion of the machine readable code is detected by a second of the two light sensors.

10. The system of claim 1, wherein the at least one source is configured as a laser, an infrared light source or a ultraviolet light source.

11. A code detecting method associated with laterally moving objects, the method comprising:
providing, by at least one light source, light;
providing a light sensor to detect light respectively provided by the at least one light source, wherein the light provided by the at least one light source reflects from a machine readable code supported by a surface of a laterally moving object;
providing at least one processor that is configured as a function of executing instructions in non-transitory processor readable media;
providing at least one display that is configured to display information provided by the at least one processor;
detecting, by the light sensor, light reflecting from at least a first portion of the machine readable code as the object moves laterally;
detecting, by the light sensor, light reflecting from at least a second portion of the machine readable code as the object moves laterally;
determining, by the at least one processor and as a function of the machine readable code, information representing the laterally moving object;
identifying, by the at least one processor, a first time when the sensor detects the light reflecting from the first portion of the machine readable code;
identifying, by the at least one processor, a second time when the sensor detects the light reflecting from the second portion of the machine readable code;
determining, by the at least one processor, a speed of the laterally moving object, as a function of the information representing the laterally moving object, the first time and the second time; and
displaying, by the display, information representing at least the speed of the laterally moving object.

12. The method of claim 11, wherein the object is configured as a disc and the machine readable code is formatted as concentric rings having respective variable width, and further wherein the first portion of the machine readable code is provided at one end of the disc and the second portion of the machine readable code is provided at the other end of the disc.

13. The method of claim 12, wherein a width of one respective ring corresponds to a value, and a different width of another respective ring corresponds to a different value.

14. The method of claim 13, wherein the values equal 0 and 1, respectively.

15. The method of claim 11, wherein the information representing the laterally moving object includes the size of the object.

16. The method of claim 11, further wherein:
the sensor is configured to detect reflected light having a particular color, and the laterally moving object is configured with a colored translucent component, and further comprising:
detecting, by the sensor, the color of the light reflecting from the machine readable code; and
determining, by the at least one processor, additional information of the laterally moving object as a function of the color of the light and the information representing the laterally moving object.

17. The method of claim 11, further comprising:
providing a communication module that is configured to communicate information from the at least one processor over a network to at least one computing device, and
communicating, by the communication module, at least the information representing the speed of the object over the network to at least one computing device.

18. The method of claim 11, further comprising:
providing a gate that is configured to include the at least one light source and the light sensor, wherein the laterally moving object passes through the gate.

19. The method of claim 11, wherein the light sensor comprises two respective light sensors, and wherein the first portion of the machine readable code is detected by a first of the two light sensors and the second portion of the machine readable code is detected by a second of the two light sensors.

20. The method of claim 11, wherein the at least one light source is configured as a laser, an infrared light source or a ultraviolet light source.

* * * * *